(12) United States Patent
Sridharan et al.

(10) Patent No.: US 11,237,803 B2
(45) Date of Patent: *Feb. 1, 2022

(54) TOOL FOR GENERATING EVENT CASE MANAGEMENT APPLICATIONS

(71) Applicant: BANK OF AMERICA CORPORATION, Charlotte, NC (US)

(72) Inventors: Vinoth Sridharan, Waxhaw, NC (US); Vinaykumar Mummigatti, Charlotte, NC (US); Deepa Kalidindi, Telangana (IN); Aditya Vellore Nagesh, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 257 days.

This patent is subject to a terminal disclaimer.

(21) Appl. No.: 16/718,570

(22) Filed: Dec. 18, 2019

(65) Prior Publication Data
US 2020/0125338 A1    Apr. 23, 2020

Related U.S. Application Data

(63) Continuation of application No. 15/699,605, filed on Sep. 8, 2017, now Pat. No. 10,514,895.

(51) Int. Cl.
| | |
|---|---|
| *G06F 8/30* | (2018.01) |
| *G06F 8/35* | (2018.01) |
| *G06Q 10/10* | (2012.01) |
| *G06F 16/93* | (2019.01) |
| *G06F 8/34* | (2018.01) |
| *G06Q 10/06* | (2012.01) |

(52) U.S. Cl.
CPC ............. *G06F 8/35* (2013.01); *G06F 8/34* (2013.01); *G06F 16/93* (2019.01); *G06Q 10/06316* (2013.01); *G06Q 10/10* (2013.01)

(58) Field of Classification Search
None
See application file for complete search history.

(56) References Cited

U.S. PATENT DOCUMENTS

| | | |
|---|---|---|
| 5,423,045 A | 6/1995 | Kannan et al. |
| 5,621,892 A | 4/1997 | Cook |
| 5,634,016 A | 5/1997 | Steadham, Jr. et al. |
| 5,717,614 A | 2/1998 | Shah et al. |
| 5,828,842 A | 10/1998 | Sugauchi et al. |
| 5,913,061 A | 6/1999 | Gupta et al. |

(Continued)

*Primary Examiner* — Bing Zhao
(74) *Attorney, Agent, or Firm* — Moore & Van Allen PLLC; James C. Edwards

(57) ABSTRACT

A system for generating event case management applications. The system requires input of event case criteria, such as, but not limited to, event case type, steps, actions associated with the steps, actors required to perform the actions, data entry documents/forms and/or data entry elements in the documents/forms, and data entry points. Based on the received inputs and rules associated with the event case type and other event case criteria, the tool automatically generates computer code that creates an event case management application. As such, the tool provides a standardized and streamlined approach to generating event case management applications that requires minimal technology support, is cost efficient and effectively delivers deployable event case management applications in minimal time.

20 Claims, 24 Drawing Sheets

(56) References Cited

U.S. PATENT DOCUMENTS

| | | |
|---|---|---|
| 6,138,121 A | 10/2000 | Costa et al. |
| 6,230,309 B1 | 5/2001 | Turner et al. |
| 6,553,378 B1 | 4/2003 | Eschelbeck |
| 6,591,300 B1 | 7/2003 | Yurkovic |
| 6,735,602 B2 | 5/2004 | Childress et al. |
| 7,062,537 B2 * | 6/2006 | Aziz ................ G06Q 10/10 709/206 |
| 7,174,557 B2 | 2/2007 | Sanghvi et al. |
| 7,269,625 B1 | 9/2007 | Willhide et al. |
| 7,409,569 B2 | 8/2008 | Illowsky et al. |
| 7,428,495 B2 | 9/2008 | Dhar et al. |
| 7,631,296 B2 | 12/2009 | Seshadri et al. |
| 7,680,683 B2 | 3/2010 | Hilerio et al. |
| 7,711,984 B2 | 5/2010 | Tenenti |
| 7,885,847 B2 | 2/2011 | Wodtke et al. |
| 8,001,420 B2 | 8/2011 | Tenenti |
| 8,271,336 B2 | 9/2012 | Mikurak |
| 8,689,131 B2 | 4/2014 | Ali et al. |
| 9,342,272 B2 | 5/2016 | Tattrie et al. |
| 9,558,031 B2 | 1/2017 | Cismas et al. |
| 9,772,873 B2 | 9/2017 | Kurian et al. |
| 9,826,027 B2 | 11/2017 | Doerr et al. |
| 2008/0147453 A1 | 6/2008 | Kogan et al. |
| 2013/0060596 A1 | 3/2013 | Gu et al. |
| 2013/0238384 A1 * | 9/2013 | Caesar ................ G06F 8/34 705/7.27 |
| 2016/0055126 A1 | 2/2016 | Doerr et al. |
| 2016/0063404 A1 | 3/2016 | Doerr et al. |
| 2016/0098661 A1 | 4/2016 | Viswanathan et al. |
| 2016/0321099 A1 | 11/2016 | Cismas et al. |

* cited by examiner

+ Create → Next Assignment                                                          ☐  &Reviewer 1

Template[E-63]

1 ——— 2 ——— ③ ——— 4 ——— 5
Case Type Details  Case Steps  Case Sequence  Case Forms  Case Actions

| Step Name | Actor Type | User Type | Queue Name |
|---|---|---|---|
| ▽ Start | | | |
| ▽ Customer Information | User | Case Created User | |

Step Name
Customer Information               Step Short Name(Should be 5-8 Char)

Actor Type                          User Type
User                                Case Created User
Available Actions                                    Days of SLA
                                                     Queue Name
Submit

[Save] [Discard]

| | | Last Updated User | |
|---|---|---|---|
| △ Access Information | User | | Add Incoming Paths |
| △ Put Request | Queue | Fulfill Complaint | Add Incoming Paths |
| △ Approval | Queue | Complaint Approval | Add Incoming Paths |
| △ End | | | Add Incoming Paths |

[Next>>]

Dashboard
My Worklist
My Cases
Calendar
Reports
Bulk User Import

Recent (E-52)
Light Weight Case
(C-110)

(E-61)

Following
No cases are being
followed

TOOL FOR GENERATING EVENT CASE MANAGEMENT APPLICATIONS

CROSS-REFERENCE TO RELATED APPLICATION

This application is a continuation of and claims priority from allowed, co-pending U.S. patent application Ser. No. 15/699,605, filed on Sep. 8, 2017 and entitled "Tool for Generating Event Case Management Applications".

FIELD OF THE INVENTION

The present invention is generally directed to computer processing and, more specifically, automatically generating computer code for event case management applications using a streamlined approach for receiving criteria that defines the process for resolving the event case.

BACKGROUND

In a large enterprise many different issues or problems, referred to herein as event cases, may arise that require resolution. Each of the different types of event cases or, in some instances, each event case requires a different approach for resolving the event case. In other words, different steps and/or actions must be taken to resolve each different type of event case. Moreover, the enterprise is likely to have applicable rules, both internally-driven and externally driven rules that dictate how the event case is to be resolved. Such rules may be dictated by the type of event cases, as well as other specifics associated with the event case, such as, but not limited to, actions required, actors performing the actions, the type of data required to be collected and the like.

In most instances, each of the different types of event cases will have individual computer applications, otherwise referred to as programs, modules, tools or the like for managing the event case resolution process. Such individual applications are necessary based on each type of event case requiring steps and/or actions to resolve the case, including different requirements in terms of data collection and the like. Typically, applications, such as event case management applications are built in a web-based, collaborative platform that allows for multiple entities to interact in the application building process. However, such collaborative environments typically pose a compliance issue, in that, the platform exposes a high volume of sensitive material, such as non-public information or the like, to many different application developers. More secure development of applications can be made possible through use of other platforms, such as a class-based, object-oriented general purpose programming language platform; however, typically such development has an extended period from concept to market (e.g., six to twelve months or the like) and tend to be cost prohibitive. In addition, such platforms are technology-driven and require a dependency on technology partners/support.

Therefore, a need exists to develop systems, methods and the like for developing and generating event case management applications for individual event cases or event case types. The desired systems, methods and like should be capable of generating any and all event case management applications across an entire enterprise while at the same time taking into account event case management rules that may be specific to segments of the enterprise, event case type and other event case management factors. Moreover, since the individual case management applications tend to be less complex applications, the desired systems, methods and the like should offer a solution that requires less in terms of technical support, for example, leveraging a standard technology stack or the like. Additionally, the desired systems, methods and like should provide for generating the event case management applications in a timely fashion so as to reduce the time from conception to implementation. In addition, the desired systems, methods and like should provide a cost advantage over current application development solutions.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing systems, methods, computer program products and like for generating event case applications for managing the process for resolving an event case. Event case, as used herein, is a problem or issue triggered by an event that requires a systematic framework (i.e., process) for resolving the problem or issue. In a large enterprise, a vast amount of different types of event cases each require a different process for resolving the event based on different steps and actions that must be taken to resolve the case and different internal and external rules that govern how the event case needs to be resolved.

The present invention provides a standardized means for generating event case applications regardless of event case type and/or the rules governing the event case type. In addition, the present invention is capable of automatically generating computer code that creates simplified event case management applications with minimal need for technology support or dependency on technology partners. Additionally, by instantaneously generating an initial event case application which serves as, at least, a prototype, the present invention is able to significantly reduce the time from conception to implementation. Moreover, the simplified approach of the present invention is able to generate event case management application in a cost efficient manner.

The present invention provides for a tool in which users input requisite event case criteria, such as steps, actions, sequencing of the steps, identification of data entry documents and associated data entry elements, as well as the steps and or actions associated with the data entry documents and/or entry elements and, based on rules applicable to at least the event case type, generates computer code that creates an application for managing the event case.

A system for generating event case management applications defines first embodiments of the invention. The system includes a first computing platform including a first memory and at least one first processor in communication with the first memory. The system further includes an event case management application rules database that is stored in the first memory. The database stores rules for generating an event case management application, wherein the rules are specific to at least case type and, in other alternate embodiments of the invention, the rules may be specific to one or more of (i) actions associated with steps of the event case, (ii) actors assigned to perform the actions, (iii) the data entry documents and/or (iv) data elements required in the event case or the like.

The system additionally includes a second computing platform including a second memory and at least one second processor in communication with the second memory. An event case management application generator tool is stored in the second memory and executable by the at least one second processor. The tool is configured to receive inputs that define criteria including case type for managing an event case. In response to receiving the user inputs, the tool is configured to access the rules database to obtain one or more rules specific to the case type and, in optional embodiments, specific to one or more of (i) actions associated with steps of the event case, (ii) actors assigned to perform the actions, (iii) the data entry documents and/or (iv) data elements required in the event case. Further, the tool is configured to apply the user inputs and one or more rules to automatically generate computer code that creates an application for managing the event case.

In specific embodiments of the system, the event case management application generator tool is further configured to receive the inputs that define the criteria for managing the event case, wherein the inputs define a plurality of steps required to resolve the event. In such embodiments of the system, the inputs include, for each of the plurality of steps, at least one of (i) a step identifier, (ii) an actor for performing the step, (iii) actions required to perform the step, and (iv) an estimated time for completing the step.

In other specific embodiments of the system, the event case management application generator tool is further configured to receive the inputs that define the criteria for managing the event case, wherein the inputs define a sequence/flow for interconnecting the plurality of steps. In such embodiments of the system, the inputs include creating paths for interconnecting the plurality of steps and the actions required to perform the steps.

In other specific embodiments of the system, the case management application generator tool is further configured to receive the inputs that define the criteria for managing the event case, wherein the inputs define one or more predetermined data entry documents and one more data elements within each of the predetermined data entry documents. In such embodiments of the system, the inputs define at least one of the steps or the actions that are associated with at least one of the one or more data entry documents or at least one of the data elements within the at least one of the data entry documents (i.e., the points in the process where data is required to be collected).

In other specific embodiments of the system, the case management application generator tool is further configured to generate the computer code that creates the application for managing the event case, wherein the application includes a plurality of user interfaces for managing a workflow for processing the event case. In other specific embodiments of the system, the application includes a process model that defines the steps and the actions required to perform the steps.

A computer-implemented method for generating event case management applications defines second embodiments of the invention. The method is executed by one or more computing device processors and includes receiving inputs that define criteria, including case type, for managing an event case, wherein an event case is defined as a process for resolving an event that requires a resolution. The method further includes, in response to receiving the user inputs, accessing a rules database to obtain one or more rules specific to the case type. Additionally, the method includes applying the inputs and the one or more rules specific to at least the case type to automatically generate computer code that creates an application for managing the event case.

In specific embodiments of the method, receiving the inputs that define the criteria for managing the event case further includes receiving inputs that define a plurality of steps required to resolve the event and, for each of the steps, at least one of (i) a step identifier, (ii) an actor for performing the step, (iii) actions required to perform the step, and (iv) an estimated time for completing the step.

In other specific embodiments of the method, receiving the inputs that define the criteria for managing the event case further comprises receiving inputs that define a sequence for interconnecting the plurality of steps including creating paths for interconnecting the plurality of steps and the actions required to perform the steps.

In still further specific embodiments of the method, receiving the inputs that define the criteria for managing the event case further comprises receiving inputs that define one or more predetermined data entry documents and one more data elements within each of the predetermined data entry documents and at least one of the steps or the actions associated with at least one of the one or more data entry documents or at least one of the data elements within the at least one of the data entry documents.

In other specific embodiments of the method accessing the rules database to obtain one or more rules further comprises accessing the rules database to obtain one or more rules specific to at least one of steps required to process the event case, actions required to perform the steps, actors required to perform the actions, data entry documents or data entry elements within the documents.

A computer program product including a non-transitory computer-readable medium defines third embodiments of the invention. The computer-readable medium includes a first set of codes for causing a computer to receive inputs that define criteria, including case type, for managing an event case. The computer-readable medium additionally includes a second set of codes for causing a computer to, in response to receiving the user inputs, access a rules database to obtain one or more rules specific to the case type, and a third set of codes for causing a computer to apply the criteria and the one or more rules specific to at least the case type to automatically generate computer code that creates an application for managing the event case.

Thus, according to embodiments of the invention, which will be discussed in greater detail below, the present invention provides for a tool for generating event case management applications. The tool requires input of event case criteria, such as, but not limited to, event case type, steps, actions associated with the steps, actors required to perform the actions, data entry documents/forms and/or data entry fields in the documents/forms, and data entry points. Based on the received inputs and rules associated with the event case type and other event case criteria, the tool automatically generates computer code that creates an event case management application. As such, the tool provides a standardized and streamlined approach to generating event case management applications that requires minimal technology support, is cost efficient and effectively delivers deployable event case management applications in minimal time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
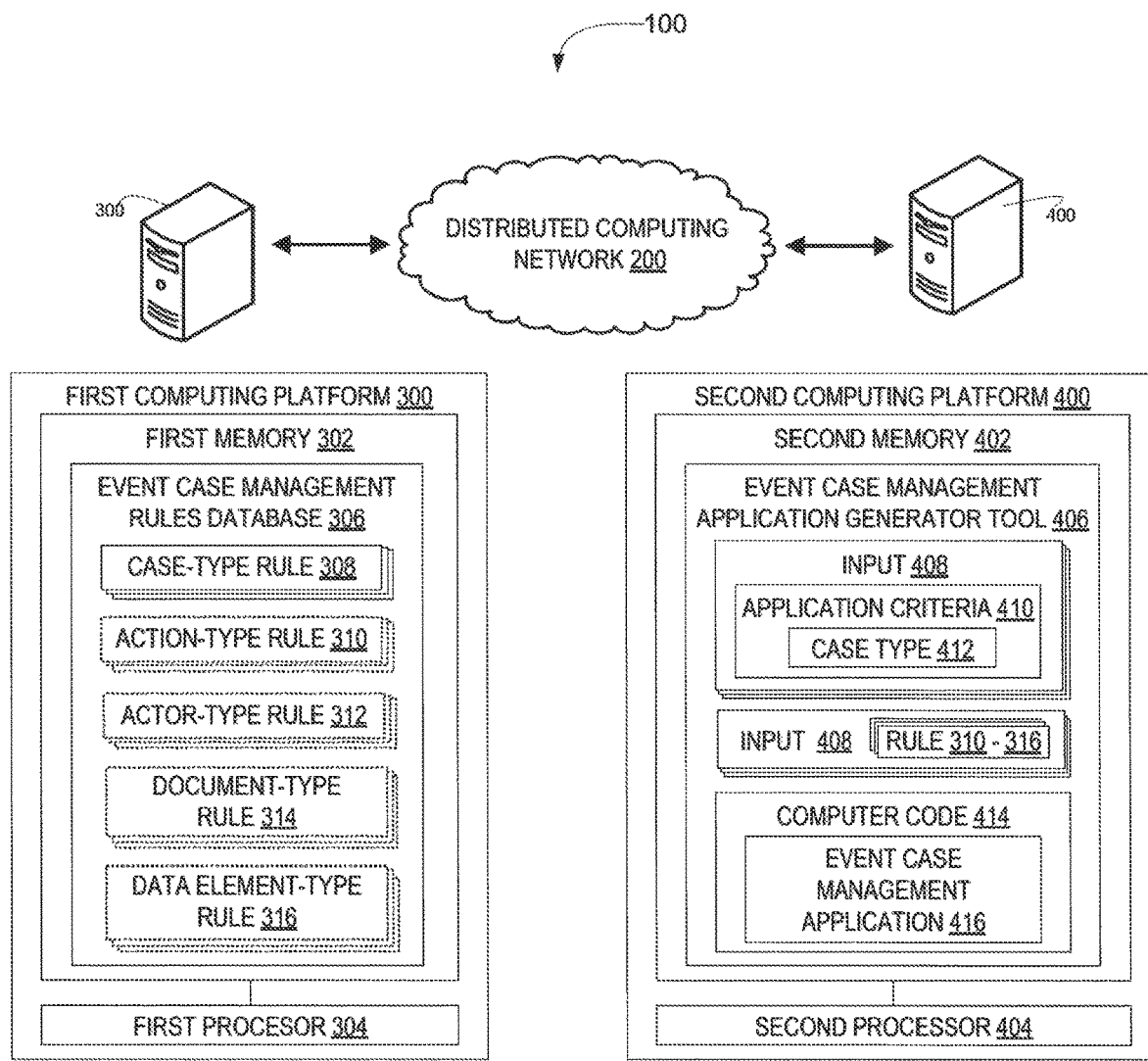
Figure 2:
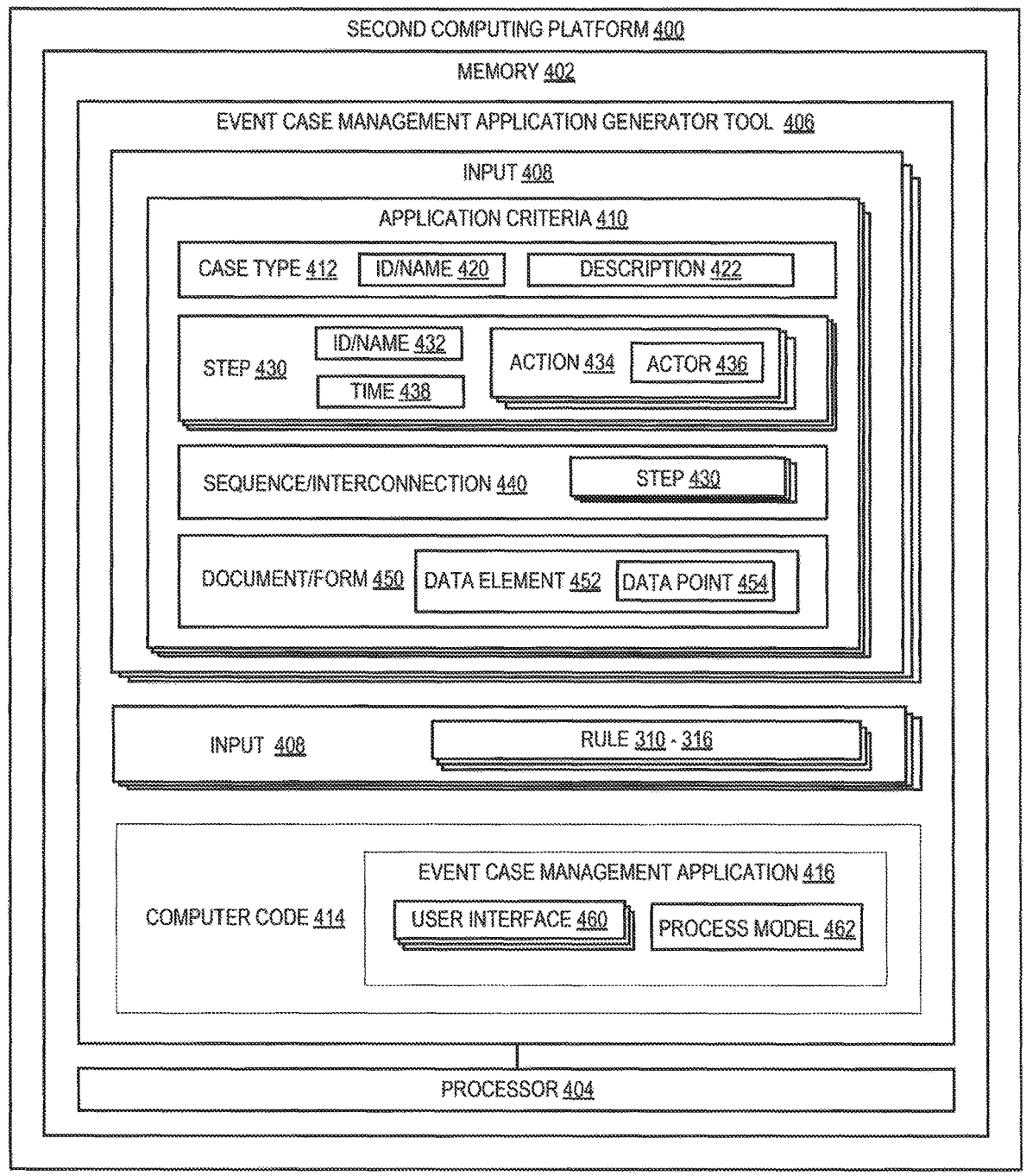
Figure 3:
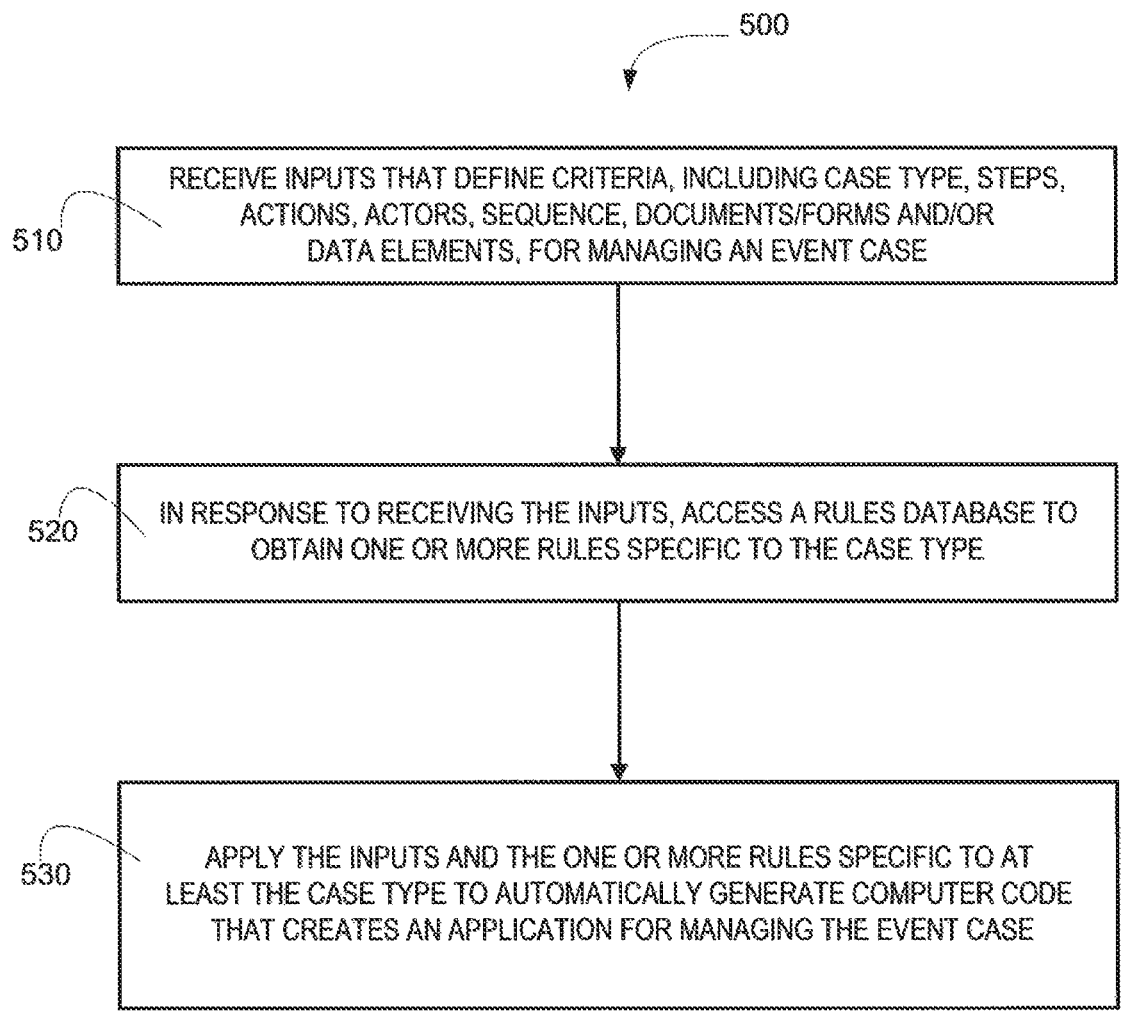

Having thus described embodiments of the invention in general terms, reference will now be made the accompanying drawings, wherein:

FIG. 1 provides a schematic diagram of a system for generating event case management applications, in accordance with embodiments of the invention;

FIG. 2 provides a block diagram of an apparatus configured for generating event case management applications, in accordance with embodiments of the invention;

FIG. 3 provides a flow diagram of a method for generating event case management applications, in accordance with embodiments of the invention; and FIGS. 4-24 provide various user interfaces used for generating an event case management application; in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

In specific embodiments of the invention the tool for generating event case management applications is built on a business process management platform. An example of such a platform is PEGA® Platform, which is provided by Pegasystems Inc. of Boston, Mass. Such capabilities provide for the user to generate an event case management application absent the need for technology involvement.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, event case applications are generated for managing the process for resolving an event case. Event case, as used herein, is a problem or issue triggered by an event that requires a systematic framework (i.e., process) for resolving the problem or issue.

The present invention provides a standardized means for generating event case applications regardless of event case type and/or the rules governing the event case type. In addition, the present invention is capable of automatically generating computer code that creates a simplified event case management application with minimal need for technology support or dependency on technology partners. Additionally, by instantaneously generating an initial event case application which serves as at least a prototype, the present invention is able to significantly reduce the time from conception to implementation. Moreover, the simplified approach of the present invention makes it possible to generate event case management applications in a cost efficient manner.

The present invention provides for a tool in which users input requisite event case criteria, such as steps, actions, sequencing of the steps, identification of data entry documents and associated entry elements, as well as the steps and or actions associated with the data entry documents and/or entry elements and, based on rules applicable to at least the event case type, generates computer code that creates an application for managing the event case.

Referring to FIG. 1 a schematic diagram is shown of a system 100 for generating event case management applications, in accordance with embodiments of the invention. The system 100 is implemented in a distributed computing network 200, which allows for computerized communication of data between different computing platforms, apparatus, devices and the like. The distributed computing network 200 may comprise the Internet, one or more intranets and/or a combination of the Internet and one or more intranets.

The system 100 includes a first computing platform 300, which may comprise one or more computing apparatus and/or devices, such as servers, storage components and the like. The first computing platform 300 includes a first memory 302 and at least one first processor 304 in communication the first memory 302. The first memory 302 stores event cased management rules database 306 that includes rules for generating event case management applications. The rules may be internal rules configured by the enterprise and/or external rules (i.e., regulatory and/or compliance rules configured by a government entity or the like). At a minimum, according to embodiments of the invention, the rules include case-type rules 308 that are based on the type of case being investigated (e.g., customer complaint, account, misappropriation or the like). In alternate embodiments of the invention the rules may include, but are not limited to, action-type rules 310, actor-type rules 312, document/form-type rules 314, data element-type rules 316 and the like. Action-type rules 310 are based on the actions assigned by the user (i.e., event case management application generator) required to conduct the event case management process. Actor-type rules 312 are based on the actor (i.e., entity/individual) assigned by the user to perform an action or step. Document/form-type rules 314 are based on the documents/forms that are assigned to the event case management process by the user and data element-rules 316 are based on the individual data elements/items, typically located in the documents/forms, that are assigned to the event case management process by the user.

The system 100 additionally includes second computing platform 400 which is in network communication with the first computing platform 300 via distributed computing network 200. Similar to the first computing platform 300, the second computing platform 400 may comprise one or more computing apparatus and/or devices, such as servers, storage components and the like. Moreover, while first and second computing platforms 300 and 400 are shown and described as separate physical entities, they may be configured as one physical computing platform and/or share in the use of individual components of the computing platforms. The second computing platform 400 includes a second memory 402 and at least one second processor 404 in communication the second memory 402. The second memory 402 stores event case management application generator tool 406, which according to specific embodiments of the invention may be built on a business process management platform, such as PEGA® Platform for application development. Such platforms provide for the user to generate an event case management application with minimal to no technology involvement.

The event case management application generator tool 406, heretofore referred to as the "tool" 406 is configured to receive a plurality of inputs 408 that define application criteria 410. The inputs may be received from a user or from auxiliary systems (not shown in FIG. 1) that support the generation of event case management applications 416. The application criteria 410 includes case type 412, which may be defined by a case name, a case identifier and/or a case description. In additional embodiments of the invention, the application criteria 410 may include, but is not limited to, steps required to perform the event case management process, action(s) required to perform a step, actors required to perform an action or step and estimated time to complete a step or action. In additional embodiments of the invention, the application criteria 410 may include, but is not limited to, the sequence for performing the steps (i.e., how each step and/or action interconnects to one or more other steps and/or actions), the documents and/or forms required from a data collection standpoint, as well as, the individual data elements within the documents/forms and the data points (i.e., the step or action within the process at which the document/form is applicable or an individual data element is applicable).

In response to receiving the inputs 408, the tool 406 is further configured to access the event case management rules database to obtain one or more rules associated with the inputs 408. At a minimum, the tool 406 is configured to obtain case-type rules 308 associated with the defined case type 412. In alternate embodiments of the invention, the tool 406 is configured to obtain one or more of action-type rules 310, actor-type rules 312, document-type rules 314 and/or data element-type rules 316.

Additionally, the tool 406 is configured to apply the application criteria 410 and the rules 310-316, to generate computer-code 414 that creates an event case management application 416 for managing the event case. The application 416 includes a series of user interfaces with various data entry fields, which form the basis for the event case management process. An event case management administrator or the like manages the event case by providing inputs into the various data entry fields as a result of performing the steps, actions and data collection required by the event case management application 416.

Referring to FIG. 2 a more detailed block diagram of the second computing platform 400 is depicted, in accordance with embodiments of the present invention. In addition to providing more details for the event case management application generator tool 406, FIG. 2 provides various optional embodiments of the system. The second computing platform 400, which may comprise one or more apparatus, devices is configured to execute algorithms, such as modules, routines, applications and the like. Computing platform 400 includes memory 402, which may comprise volatile and non-volatile memory, such as read-only and/or random-access memory (RAM and ROM), EPROM, EEPROM, flash cards, or any memory common to computer platforms).

Moreover, memory 402 may comprise cloud storage, such as provided by a cloud storage service and/or a cloud connection service.

Further, computing platform 400 also includes processor 404, which may be an application-specific integrated circuit ("ASIC"), or other chipset, logic circuit, or other data processing device. Processor 404 may execute an application programming interface ("API") (not shown in FIG. 2) that interfaces with any resident programs, such as event case application generator tool 406 or the like stored in the memory 402 of the computing platform 400.

Processor 404 may include various processing subsystems (not shown in FIG. 2) embodied in hardware, firmware, software, and combinations thereof, that enable the functionality of the computing platform 400 and the operability of the computing platform 400 on the distributed computing network 200 (shown in FIG. 1). For example, processing subsystems allow for initiating and maintaining communications and exchanging data with other networked devices. For the disclosed aspects, processing subsystems of processor 404 may include any subsystem used in conjunction with event case application generator tool 406 and related subroutines, algorithms, sub-algorithms, modules, sub-modules thereof.

Computer platform 400 may additionally include a communications module (not shown in FIG. 2) embodied in hardware, firmware, software, and combinations thereof, that enables electronic communications between the computing platform 400 and other platforms, apparatus and/or devices (shown in FIG. 1). Thus, communication module may include the requisite hardware, firmware, software and/or combinations thereof for establishing and maintaining a network communication connection.

Memory 404 of computing platform 400 stores event case management application generator tool 406, which is built on a business process management platform such that a series of user interfaces are presented that ask a user various different queries to establish the application criteria 410 for generating the computer code 414 that creates the event case management application 416.

As previously discussed in relation to FIG. 1, the event case management application generator tool 406 is configured to receive, in response to presentation of the queries, a plurality of inputs 408 that define application criteria 410. The inputs may be received from a user or, in alternate embodiments of the invention, from auxiliary systems that support the generation of event case management applications 416. The application criteria 410 includes case type 412, which may be defined by a case name/case identifier 420 and/or a case description 422. In additional the application criteria 410 may include, but is not limited to, steps 430 required to perform the event case management process, including a step name/identifier 432, action(s) 434 required to perform a step 430, actors 436 required to perform an action 434 (or step 430), and an estimated time 438 to complete a step or action (or other service level agreement (SLA) associated information).

Additionally, the application criteria 410 may include, but is not limited to, a sequence 440 for performing the steps 430 (i.e., how each step 430 and/or action 434 interconnects to one or more other steps 430 and/or actions 434). The sequencing forms the methodology/flow for performing the event case management process.

In addition, the application criteria 410 includes the documents/forms 450 required from a data collection standpoint, as well as, the individual data elements 452 within the documents/forms 450 and the data points 454 (i.e., the step 430 or action 434 within the process at which the document/form 450 is applicable or where the individual data element 452 is required to be inputted/collected).

In response to receiving the inputs 408, the tool 406 is further configured to access the event case management rules database (shown in FIG. 1) to obtain one or more rules 310-316 associated with the inputs 408. At a minimum, the tool 406 is configured to obtain case-type rule(s) 308 associated with the defined case type 412. In alternate embodiments of the invention, the tool 406 is configured to obtain one or more of action-type rules 310, actor-type rules 312, document-type rules 314 and/or data element-type rules 316.

Additionally, the tool 406 is configured to apply the application criteria 410 and the rules 310-316, to generate computer code 414 that creates an event case management application 416 for managing the event case. The application 416 includes a series of user interfaces 460 with various data entry fields, which form the basis for the event case management process. As shown in FIGS. 4-24 and described infra., an event case management administrator or the like manages the event case by providing inputs into the various data entry fields as a result of performing the steps, actions and data collection required by the event case management application 416. In additional embodiments of the invention, the event case management application includes a process model 462, which is configured to illustrate the flow/process for performing the steps 430 and/or actions 434 that define the event case management process.

Referring to FIG. 3, a flow diagram is presented of a method 500 for generating an event case management application, in accordance with embodiments of the invention. At Event 510, a plurality of inputs are received that define the application criteria for the event case management process. As previously discussed the application criteria includes the case type (i.e., inputs that provide for a case name, a case identifier and/or a case description). Additionally, the application criteria may include steps required of event case management process, one or more actions associated with a step, actors required to perform the actions/steps and an estimated time for completing a step or action. Additionally, the application criteria may include the sequencing/interconnection of the steps and/or actions, which provide for the methodology/flow for performing the event case management process. In addition, the application criteria may include the documents/forms required by the event case and the data elements within the documents/forms that are required, as well as the data points (i.e., steps and/or actions) at which the data elements are required to be inputted/collected.

At Event 520, in response to receiving the application criteria, the rules database is accessed to obtain one or more rules specific to at least the case type. In other embodiments of the invention, the rules may be specific to action-type, actor-type, document/form-type, data element-type or the like. As previously noted, the rules may be rules internal to the enterprise or rules/standards external to the enterprise (e.g., regulatory, compliance rules or the like).

At Event 530, the application criteria and the rules are applied to automatically generate computer code that creates an application for managing the event case. The application comprises a plurality of user interfaces that provides the process for event case management as defined by the steps and actions required. In addition, the application may include a process model that illustrates the overall process/flow for event case management and shows and highlights the progress being made to complete the process (i.e., where the process currently resides and/or steps/actions outstanding).

FIGS. 4-24 provide various illustrations of exemplary graphical user interfaces (GUIs) used to generate an event case management application, in accordance with embodiments of the present invention. As depicted in FIGS. 4-24, the GUIs present a user (i.e., an event case management application developer) with a simplified lightweight case template for creating customized applications to handle the various types of cases that may arise at an enterprise. It should be noted that the GUIs as depicted in FIG. 4-24 may be presented to the user on any number of devices. For example, the GUIs may be presented on a Personal Computer (PC), a desktop computer, a laptop computer, a mobile device, or the like. The layout of the GUI as depicted in FIGS. 4-24 is by way of example only and, thus, may be altered in some degree to reflect the different devices through which a user accesses the GUI. However, the features as described herein may be present in any such embodiment.

Figure 4:
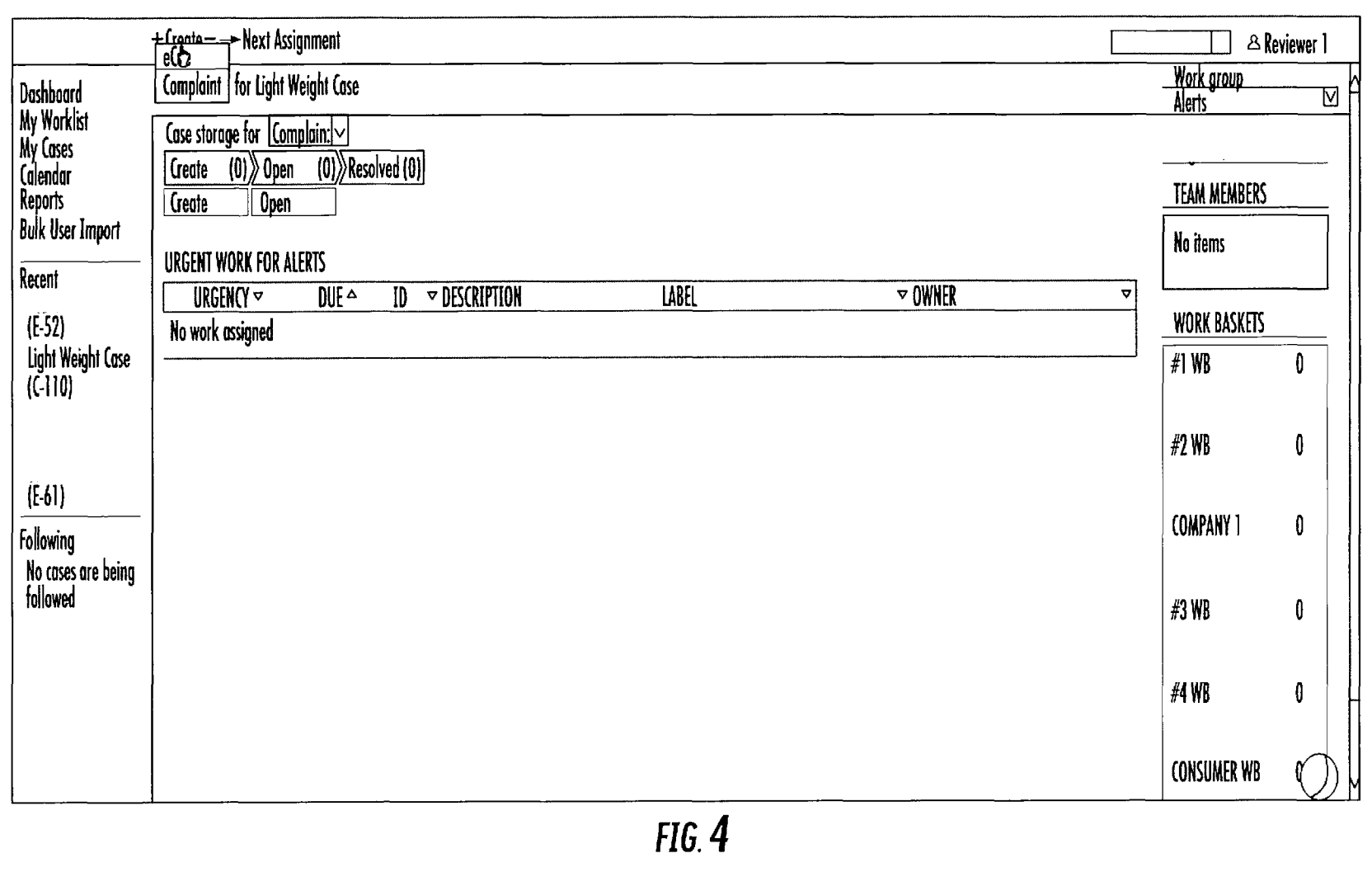

In the GUI of FIG. 4, an initial user interface is provided from which a user can select a "create" option to initiate the process for generating an event case management application. Specifically, as shown in FIG. 4 the user may select from options "create", "open", and "resolved" to begin processing a case application. The "create" option allows a user to create a new application, which may be desirable if an application for handling such an event case has not yet been created by the event case management application generator tool (i.e., "tool"). The "open" option allows the user to open an existing application which is in the process of being created. The "open" may be desirable if the user has started creating an application but the application has not yet been completed or otherwise created by the tool. The "resolved" option allows a user to open applications that have been created, i.e., applications that the tool has previously generated.

As shown in FIG. 4, the tool may be configured to provide the user with other features. For example, a user may work with additional users or team members (i.e., a collaborative effort) in creating applications for any given case. As shown in FIG. 4, there is a menu on the right-hand side of the GUI displaying "TEAM MEMBERS" if there are any such additional users for a given case. Moreover, the right-hand side of the GUI of FIG. 4 includes a "WORK BASKET" menu that allows a user to select from Work Baskets in the event that particular cases that are in process for generating an associated application are categorized into such work baskets. A user may also select from recently worked on cases under the "Recent" menu depicted on the left-hand side of the GUI.

Figure 5:
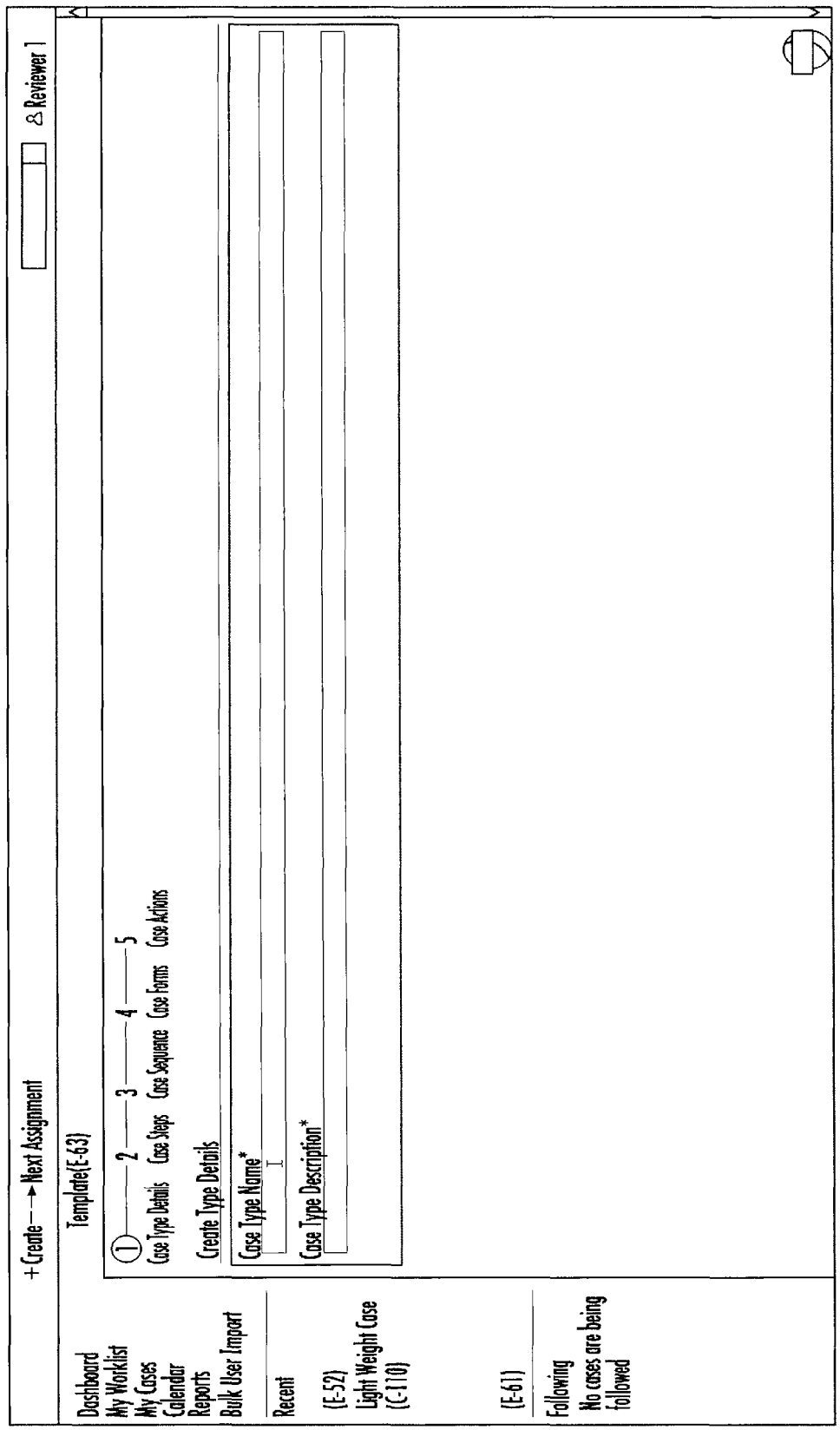

FIG. 5 depicts the GUI after a user has selected the "create" option as detailed above. As shown in FIG. 5, in some embodiments of the invention the GUI features a status/progress bar indicating the progress of the user in creating the event case management application. In FIG. 5, the status/progress bar indicates that the user is at Step 1—Case Type Details (indicated by the circle surrounding the number "1"), while steps 2 through 5 (Case Steps, Case Sequence, Case Forms and Case Actions) remain. The remaining steps 2-5 will be described in greater detail herein with accompanying figures depicting how those steps are accomplished in the tool.

FIG. 5 also depicts an input box for a user to input application criteria regarding the Case Type Name and a Case Type description. As described previously the case type application criteria may be the basis for one or more rules that are subsequently applied when generating the computer code that creates the event case management application. As depicted in FIG. 5, these inputs may be inputted in simple text form using a keyboard, touchpad, or other input device. In FIG. 5, and throughout the remaining figures, some user input prompts are accompanied by an indication that certain other application criteria is required. In FIG. 5, the asterisk indicates that both the Case Type Name and Case Type Description are required inputs. The tool is configured such that further progress within the tool is not possible until the user has inputted values in the data entry field deemed to be required.

Figure 6:
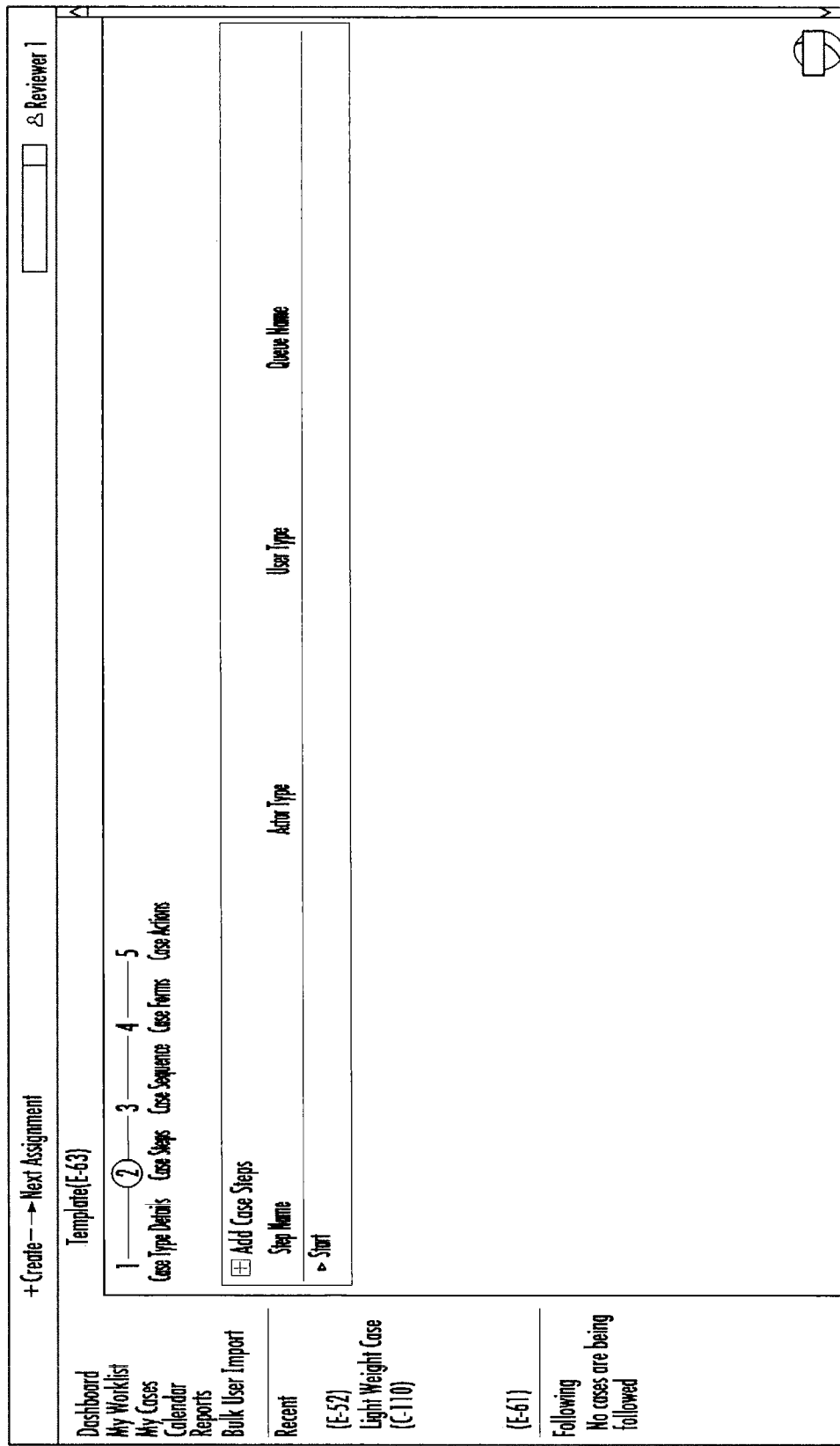

FIG. 6 depicts the Case Steps input phase of the event case management application generation process. The status/progress bar indicates that the user is at Step 2—Case Steps (indicated by the circle surrounding the number "2" of the status/progress bar), In the GUI of FIG. 6, the tool is configured to allow a user to define steps for resolving a case of the Case Type defined in Step 1 and shown in FIG. 5. The GUI of FIG. 6 is configured as a table-type layout where case steps are displayed once they have been inputted by the user. The table will display at least the Step Name, Actor Type, User Type, and Queue Name for each Case Step inputted by the user. In the GUI of FIG. 6, Case Steps have yet to be added by the user. However, a user may define a new Case Step by selecting the Add Case Steps option (indicated by the box-enclosed plus sign "+" icon).

Figure 7:
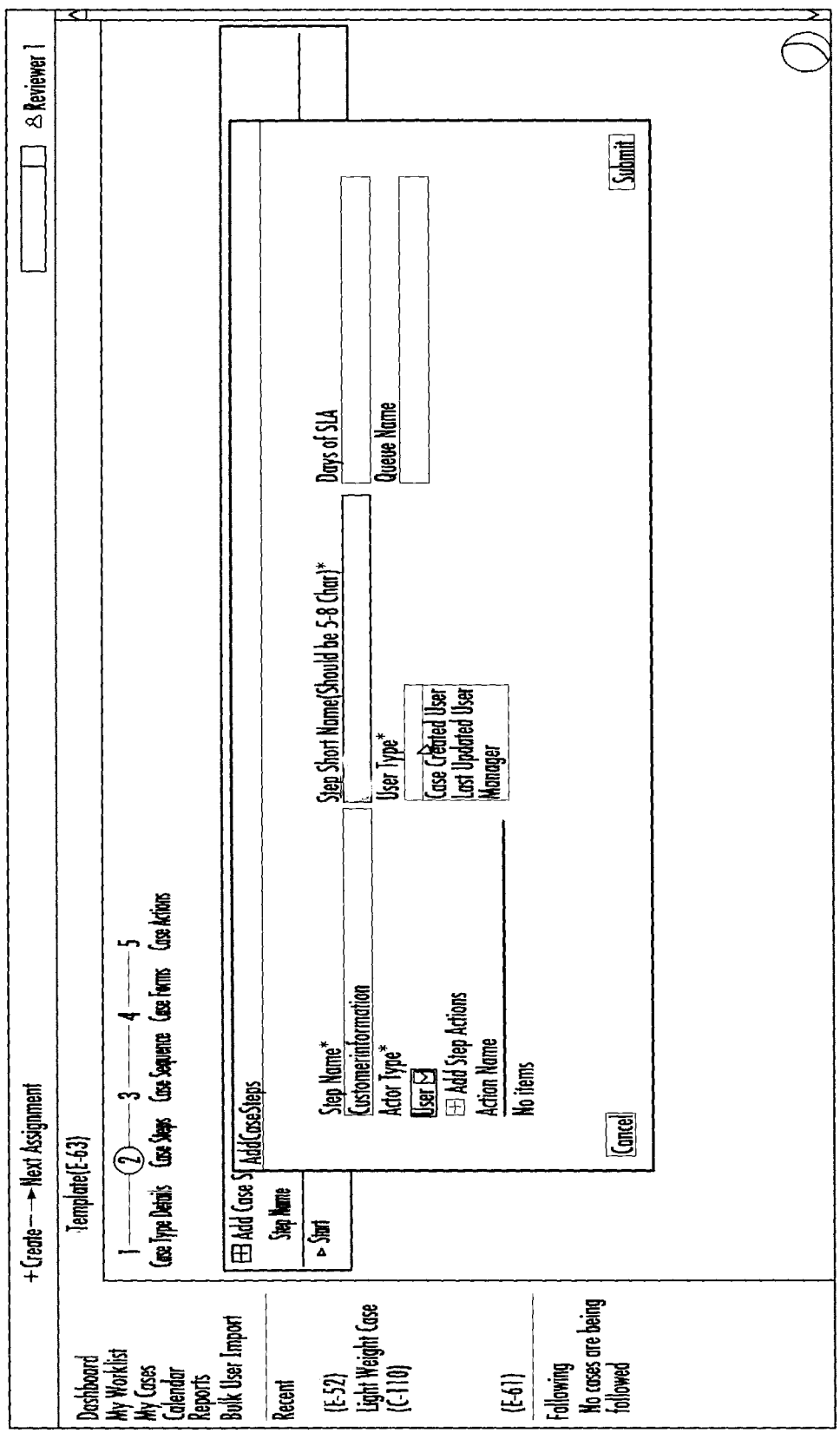

FIG. 7 depicts the dialog box GUI displayed to the user in response to the user selecting the Add Case Steps option described in FIG. 6. As shown in FIG. 7, the addition of a new Case Step includes required inputs for a Step Name, an Actor Type (i.e. type of individual required to perform the step), a Step Short Name (i.e., abbreviated name of step), and the User Type. The tool may be additionally configured to allow the user to also add optional application criteria relating to the Days of Service Level Agreement (SLA) (i.e., estimated time for completing the step) and the Queue Name. Further, the tool may be configured to allow the user to add Step Actions for the Actions associated with the Case Step, if necessary.

The Step Name and Step Short Name are titles and/or names for the individual steps required for the particular Case Type. For example, a Step Name may be "Complaint Information" while a Step Short Name for the same Case Step may be CompInfo. The Step Name and Step Short Name serve as indicators to the user that may suggest some details of the particular Case Step. As shown in the GUI of FIG. 7, the Actor Type and User Type may be selected from a drop down menu. However, it should be understood that it may also be inputted through other means, such as through text entry. The Actor Type is the type of actor/individual required to perform the step and/or action defined within the event case management application. As shown in FIG. 7, the Actor Type may be a "User" or it may also be another type of actor, such as a "Service Level" or "Queue." Similarly, the User Type may be a "Case Created User", a "Last Updated User", or a "Manager." The User Type defines the individual who will use the case management application at a particular step.

Figure 8:
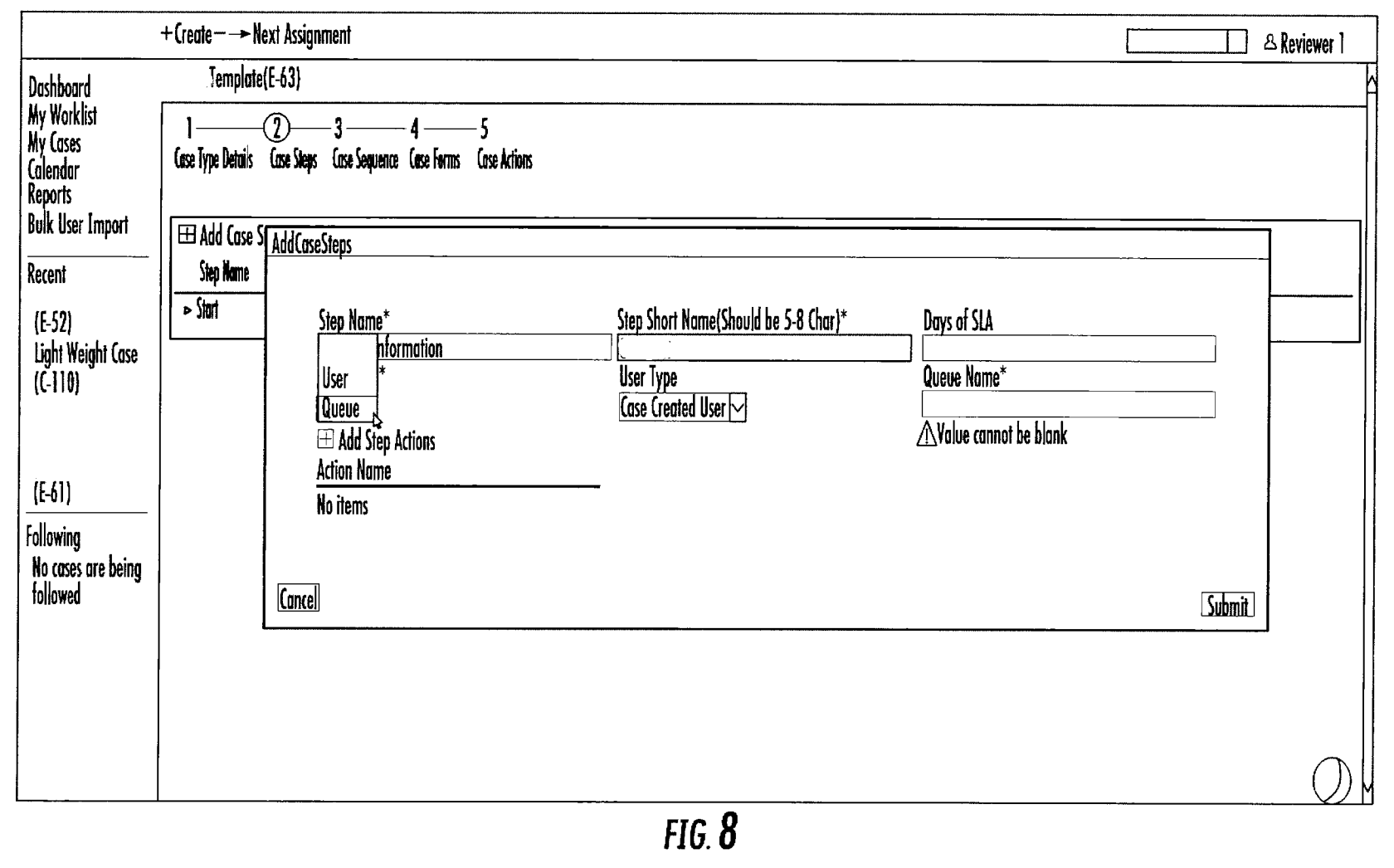

Referring to FIG. 8, the dialog box for entering a Case Step as shown in FIG. 7 is depicted. In the dialog box of FIG. 8, the Actor Type is changed to Queue. As shown in FIG. 8, by changing the Actor Type to Queue, the dialog box for Queue Name becomes a required field. Thus, the user will not be able to proceed with the Case Step unless a value for Queue Name has been inputted. A Queue is defined herein as a group of individuals, where the step or action is assigned to the queue, such that a next available individual within the queue is assigned the step and/or action.

Figure 9:
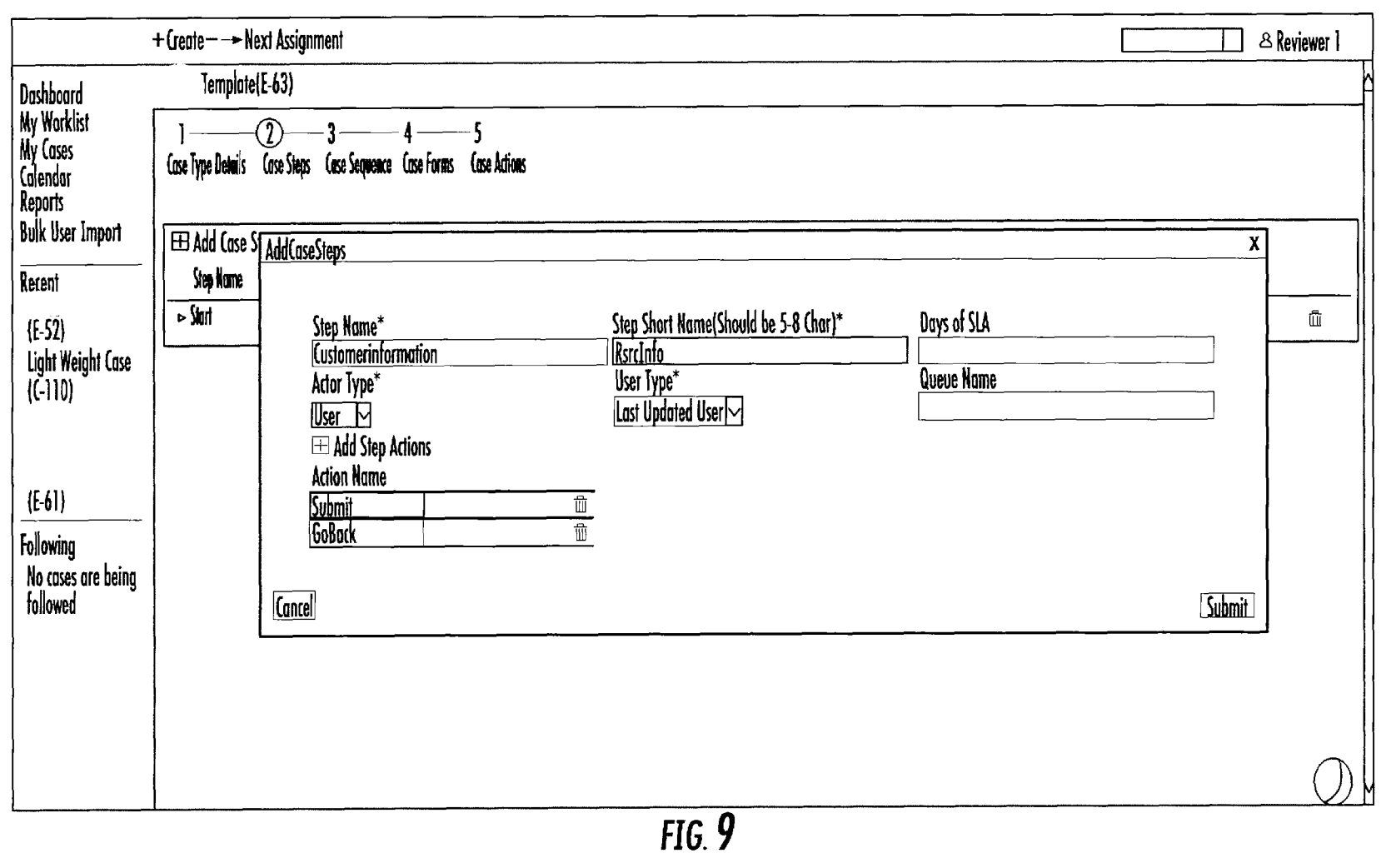

FIG. 9 depicts the dialog box for entering a Case Step, as shown in FIGS. 7 and 8. In FIG. 9, unlike FIGS. 7 and 8, the Case Step requires Actions. Thus, as shown in FIG. 9, the user has added Actions by selecting the Add Step Actions option in the dialog box. As shown, by selecting the Add Step Actions dialog box, the user is presented with an entry form to add Actions. In FIG. 9, the Actions that have been added are "Submit" and "Go Back," but it should be understood than any Actions may be entered depending on the needs of a Given Case Step.

Figure 10:
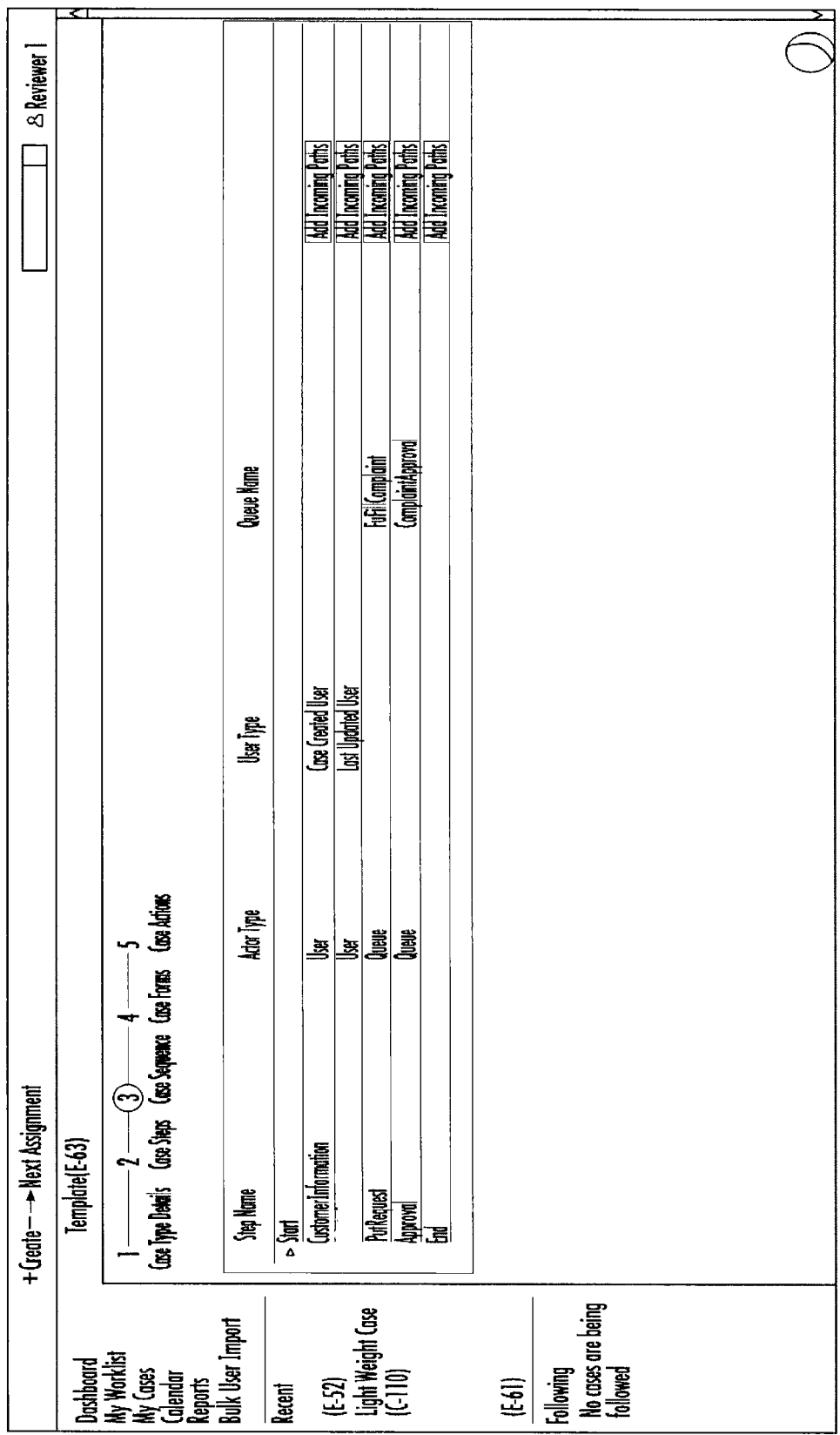

Referring to FIG. 10, the event case management application generation process has progressed to Step 3 entitled Case Sequence. The status/progress bar indicates that the user is at Step 3—Case Sequence (indicated by the circle surrounding the number "3" of the status/progress bar). In the Case Sequence step the tool is configured to allow the user to define the sequence in which the Case Steps previously defined and discussed with respect to FIGS. 7-9 are to be executed in the final case application. As shown in the GUI of FIG. 10, the various previously defined Case Steps are organized with reference to their Step Name, Actor Type, User Type, and Queue Name. Additionally, the tool is configured such that each of the Case Steps have the option to Add Incoming Paths, wherein the user can add incoming paths to each of the previously defined Case Steps.

Figure 12:
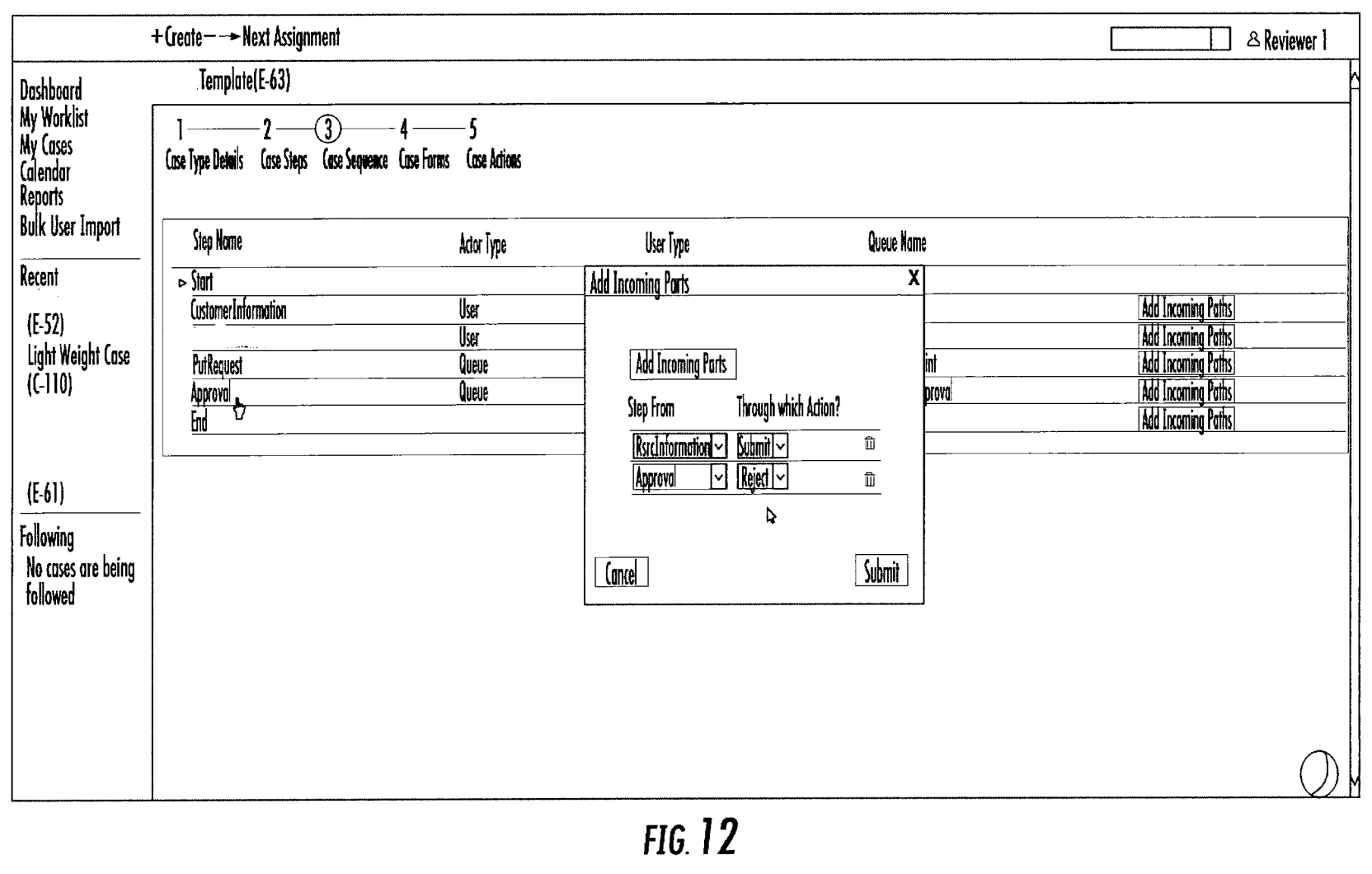

FIGS. 11-12 depict an additional dialog box displayed in response to a user selecting to Add Incoming Paths to an existing Case Step. As shown in FIG. 11, the tool is configured to present a series of drop down menus for each path the user wishes to add. The drop down menus are configured to allow the user to select from which Case Step the path will begin and through which Action associated with the Case Step the path will go through. For example, as shown in FIG. 12, the user has selected to add an incoming path from the approval case step, which was previously defined in a manner similar to that described for FIGS. 7-9. The user then selects the path to go through the action of "Reject" which was previously defined as an Action for the associated Case Step for Approval.

FIG. 13 depicts a GUI according to embodiments of the invention after a user has created incoming paths. The GUI shown in FIG. 13 appears similar to that as depicted in FIG. 10; however, the Case Step "Customer Information" has been expanded to display additional information about the Case Step. The additional information displays the information added during Step 2—Case Steps and the available actions previously defined. If a user has added or changed any of this information, they have the option to Save or Discard any changes.

Figure 14:
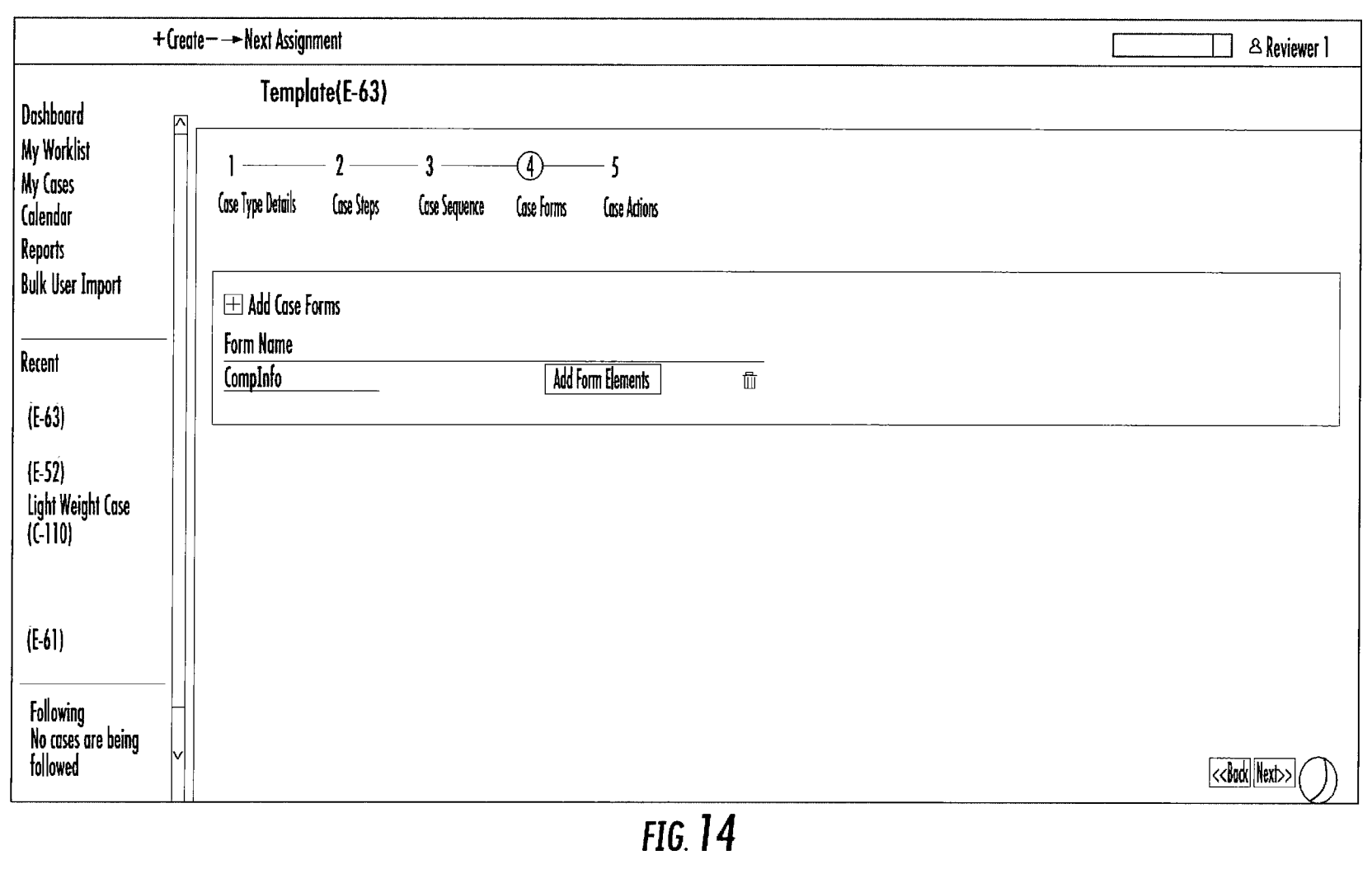

Referring to FIG. 14 the event case management application generation process has progressed to Step 4 entitled Case Forms. The status/progress bar indicates that the user is at Step 3—Case Forms (indicated by the circle surrounding the number "4" of the status/progress bar). In Step 4 the tool is configured to allow a user to define Case Forms/ Documents and to add data elements to those Case Forms/ Documents. As shown in FIG. 14, the tool is configured to allow the user to select the Add Case Forms option to add a Case Form. The user may further define the Form Name and Add Form Elements to add elements to the Case Form.

Figure 15:
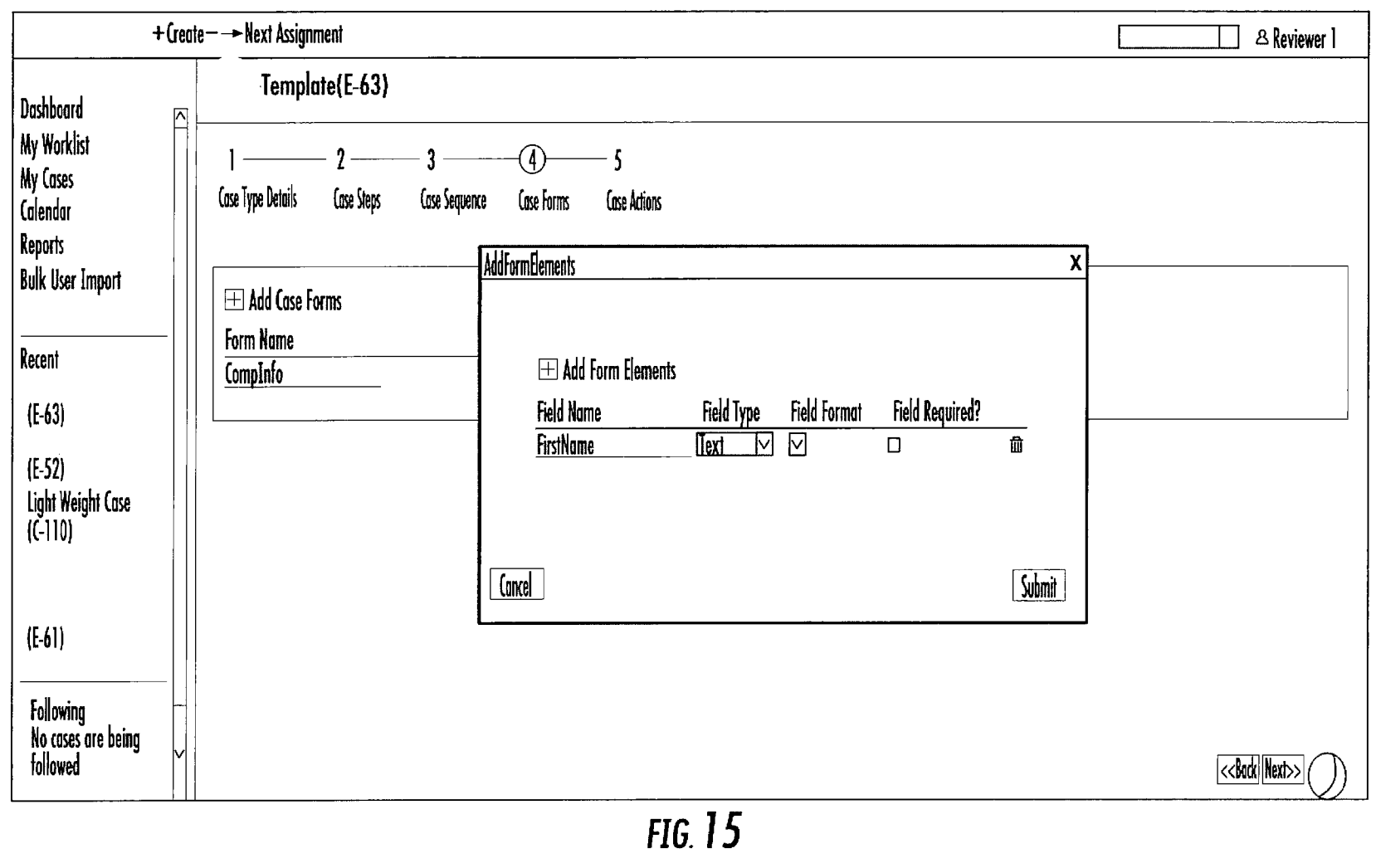
Figure 16:
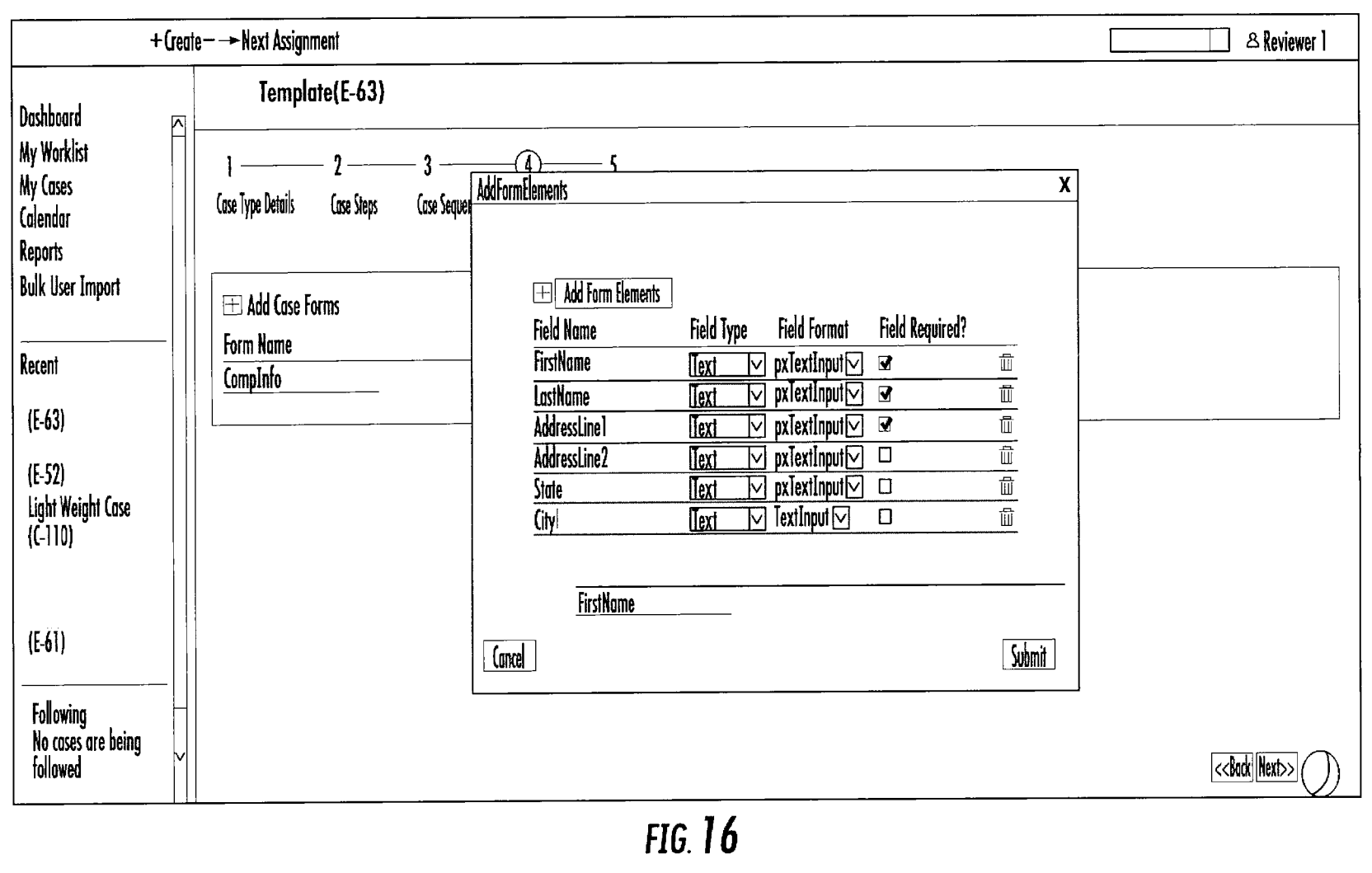

FIG. 15 depicts a dialog box that is configured to be displayed to the user in response to selection of an Add Form Elements. The dialog box is configured with an option for the user to Add Form Elements. In response to activating the Add Form Elements option, the tool is configured to allow the user to enter a Data Field Name, select from a drop down menu a Field Type, select a Field Format, and provide an indication as to whether the Field is a required field. Once the user has determined the parameters for the Form Element, the user can submit the Form Element and add it to the respective Form. FIG. 16 shows the dialog box as additional Form Elements are added to the Form. As shown in FIG. 16, some of the Form Elements have been designated as Required and have a field format as pxTextInput or TextInput. It should be understood that other Field Formats may be appropriate for Field Types that have been designated as something other than Text.

Figure 17:
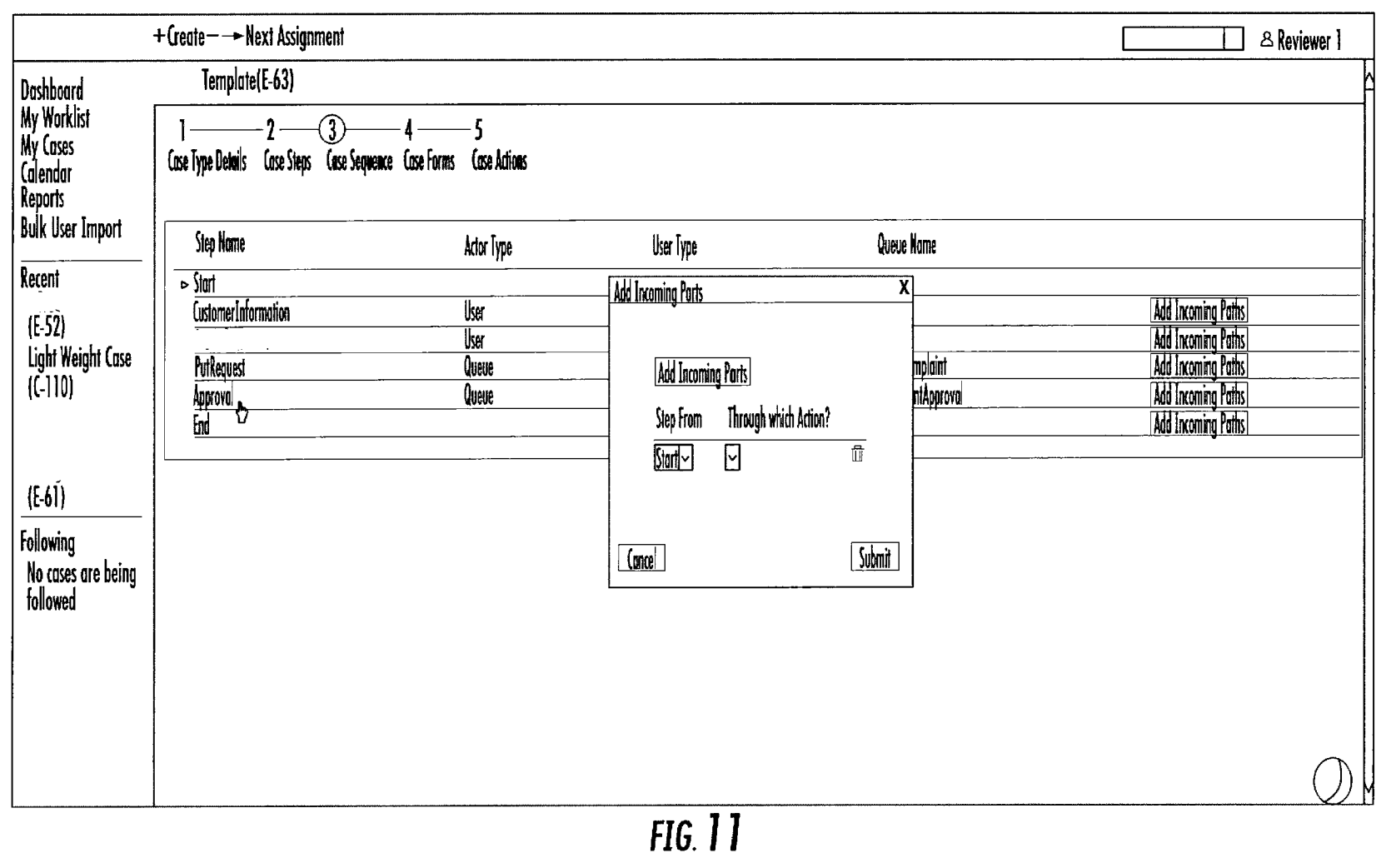

After the user has entered the desired Case Forms and determined the appropriate Form Elements for each, the GUI shown in FIG. 17 is displayed. FIG. 17 depicts a GUI in which the event case management application generation process has progressed to Step 5 entitled Case Actions. The status/progress bar indicates that the user is at Step 5—Case Actions (indicated by the circle surrounding the number "5" of the status/progress bar). As shown in FIG. 17, the tool is configured to allow the user to add Forms to any of the Case Actions defined in the previous input phases of the event case management application generation process. As shown, some of the Process Steps may have multiple Actions associated with them. For example, as shown in FIG. 17, FulfillRequest has both a Submit and a Previous Action defined. Thus, the tool is configured to present two separate Add Forms options for each of those Actions, in order to allow the user to add separate forms for the applicable Action.

Figure 18:
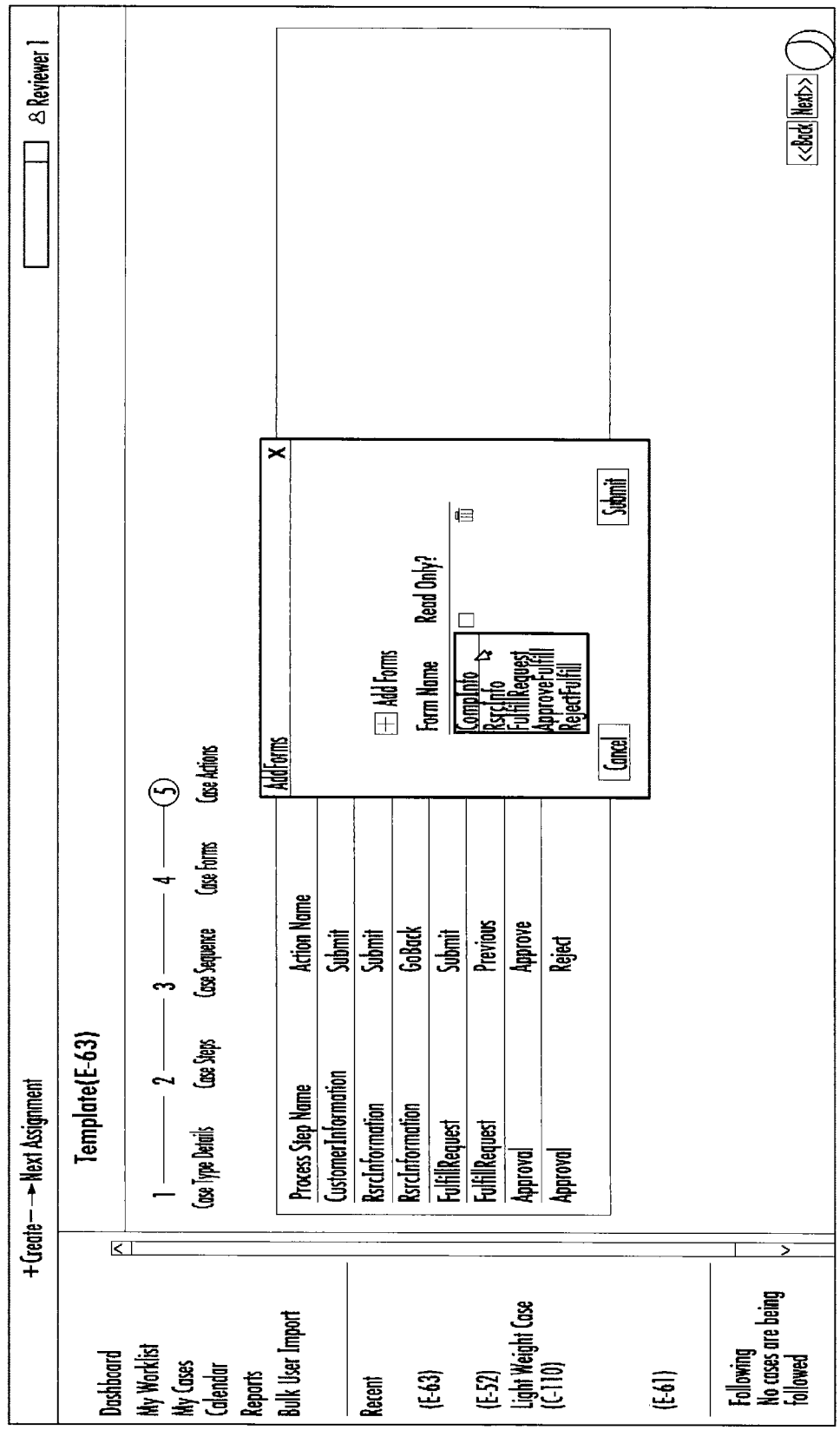

In response to a user selecting an action to add a Case Form, the dialog box shown in FIG. 18 appears. The dialog box is configured to allow the user to select from a prepopulated list of the Forms previously created in step 4 and assign them to the corresponding action. The tool is also configured to allow the user to select an option to make the form Read Only. The Read Only option provides for the Form to be un-editable by the application user once the application has been created.

Figure 19:
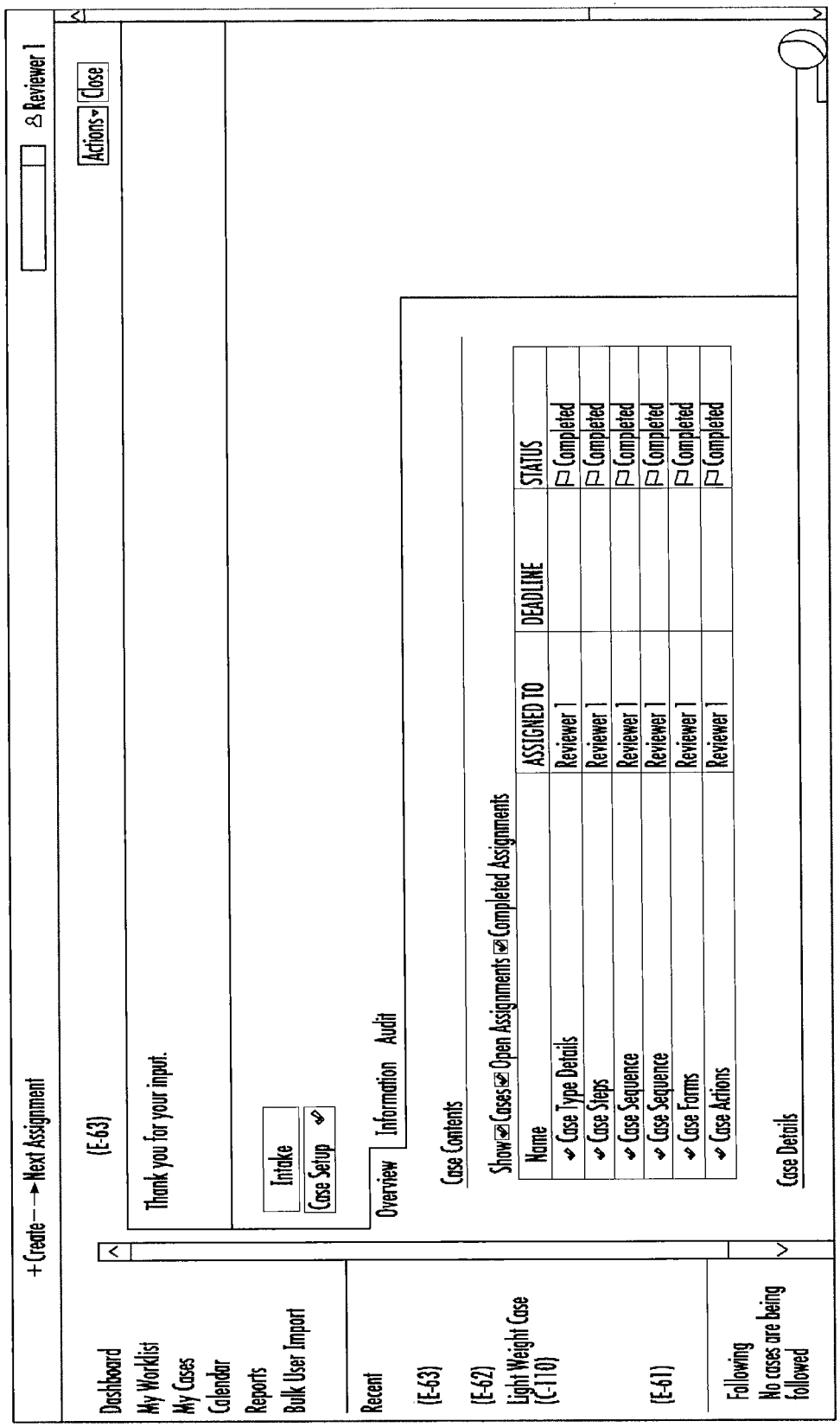

After assigning the Forms to the corresponding actions, the user has input all of the necessary information for the tool to create the event case management application. Referring to FIG. 19, the tool is configured to present a GUI in which Case Content is shown as a list of the Case Steps, an assigned reviewer for each Case Step and the status of the case review process. Each of the Case Steps are required to be reviewed prior to creating the event case management application.

Figure 20:
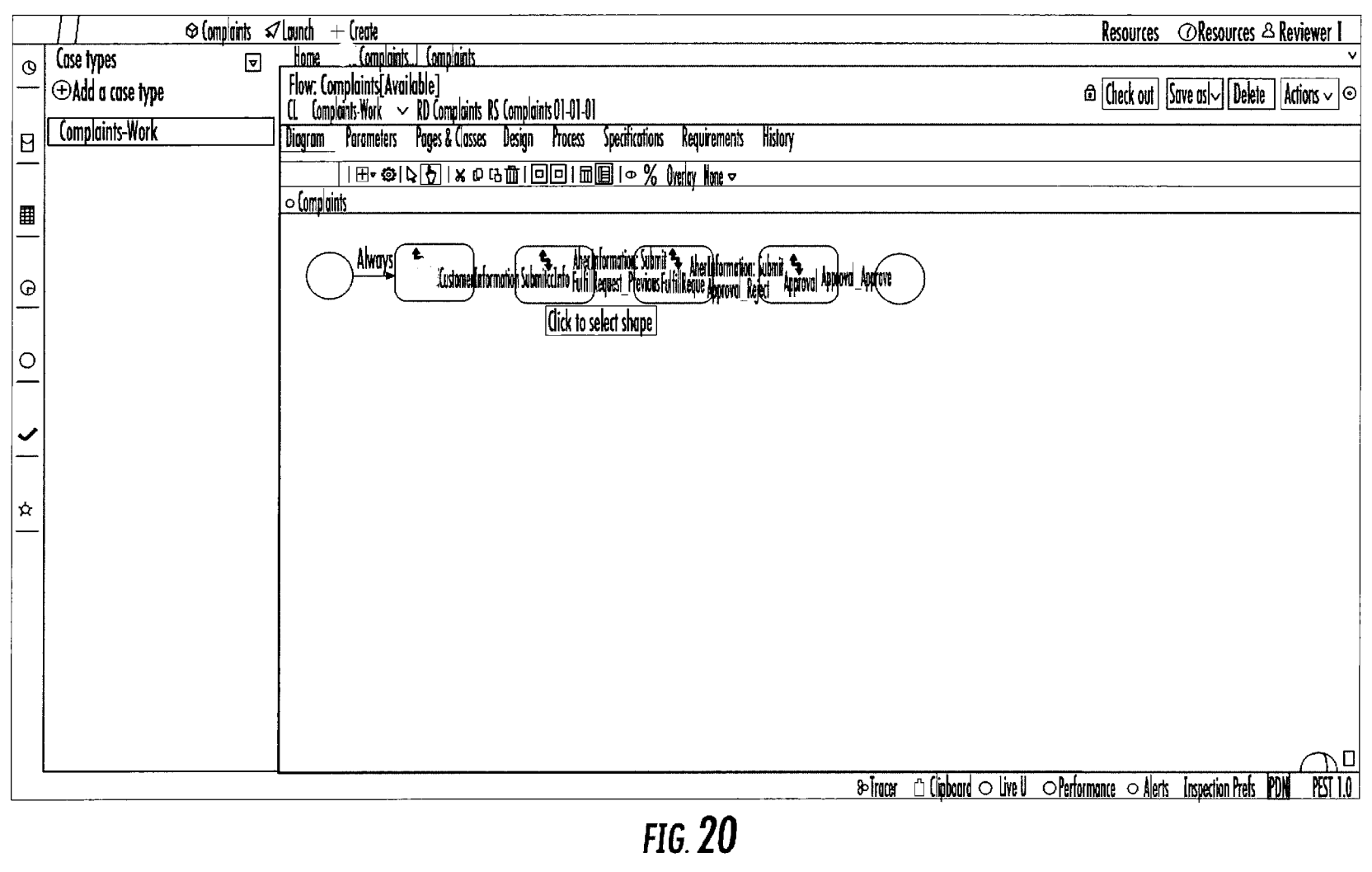
Figure 21:
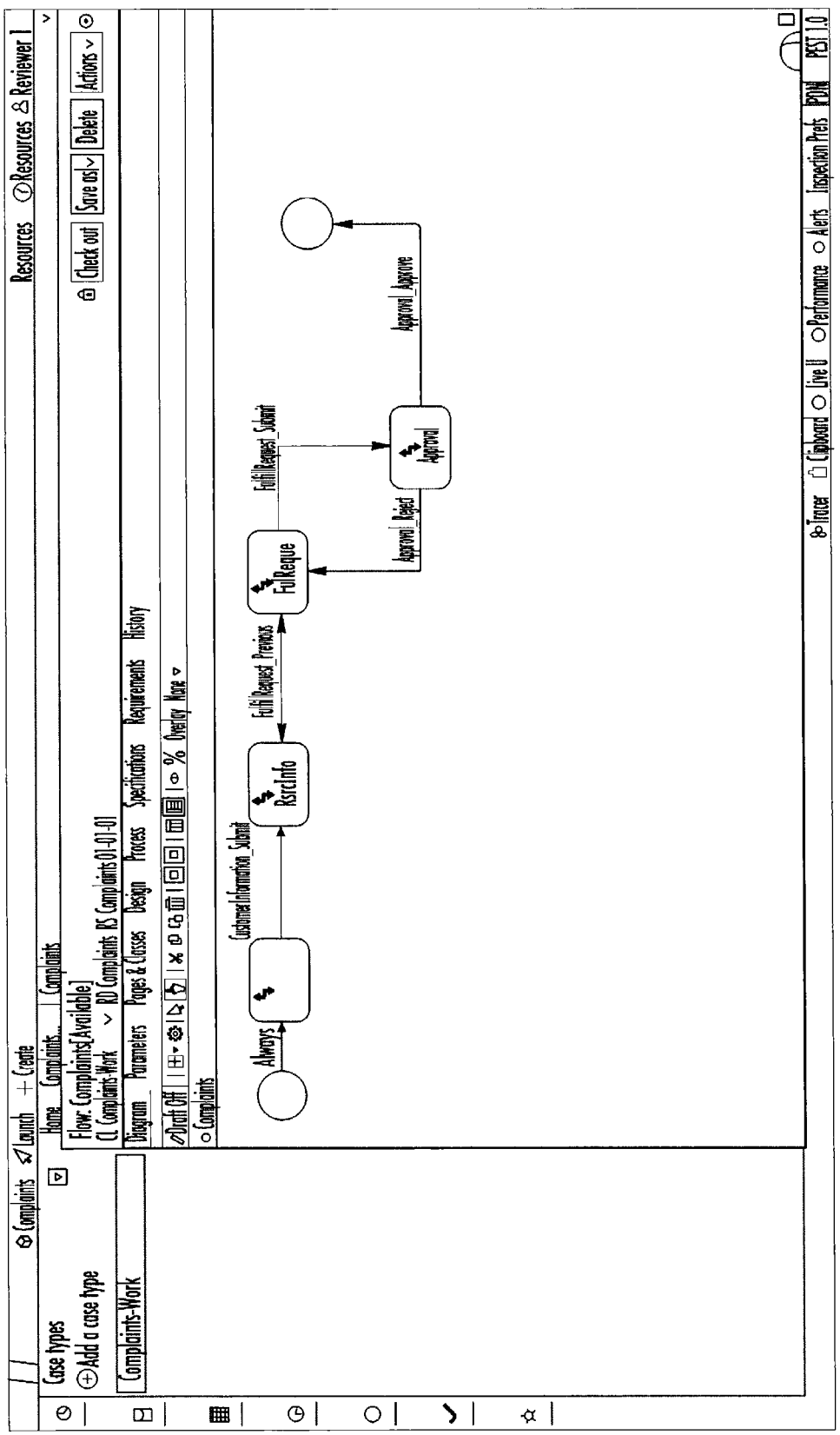

Referring to FIGS. 20 and 21 a flow chart of the overall event case management process is depicted which is configured to allow the user to view a visual representation of the case management application to be created based on the user inputs in the above described steps. As shown in FIG. 20, the Case Steps are arranged linearly beginning with Start and ending at the End Case Step. Each Case Step is connected by the Actions defined by the user and the corresponding input paths. In FIG. 21, the user has separated the Case Steps to better demonstrate the process flow of the application. As shown in FIG. 21, the Case Steps are connected by the previously defined Actions and input paths. For example, if the application is at Case Step FulReque, and the Action FulfillRequest_Submit is completed, the case management application will move to the Approval Case Step. At Approval, there are two possible Actions that can be taken. If the end user completes Action Approval_Reject, the case management application will return to the FulReque Case Step. However, if the end user completes action Approval_Approve, the case management application has resolved the case and the application will reach the End Case Step.

Figure 22:
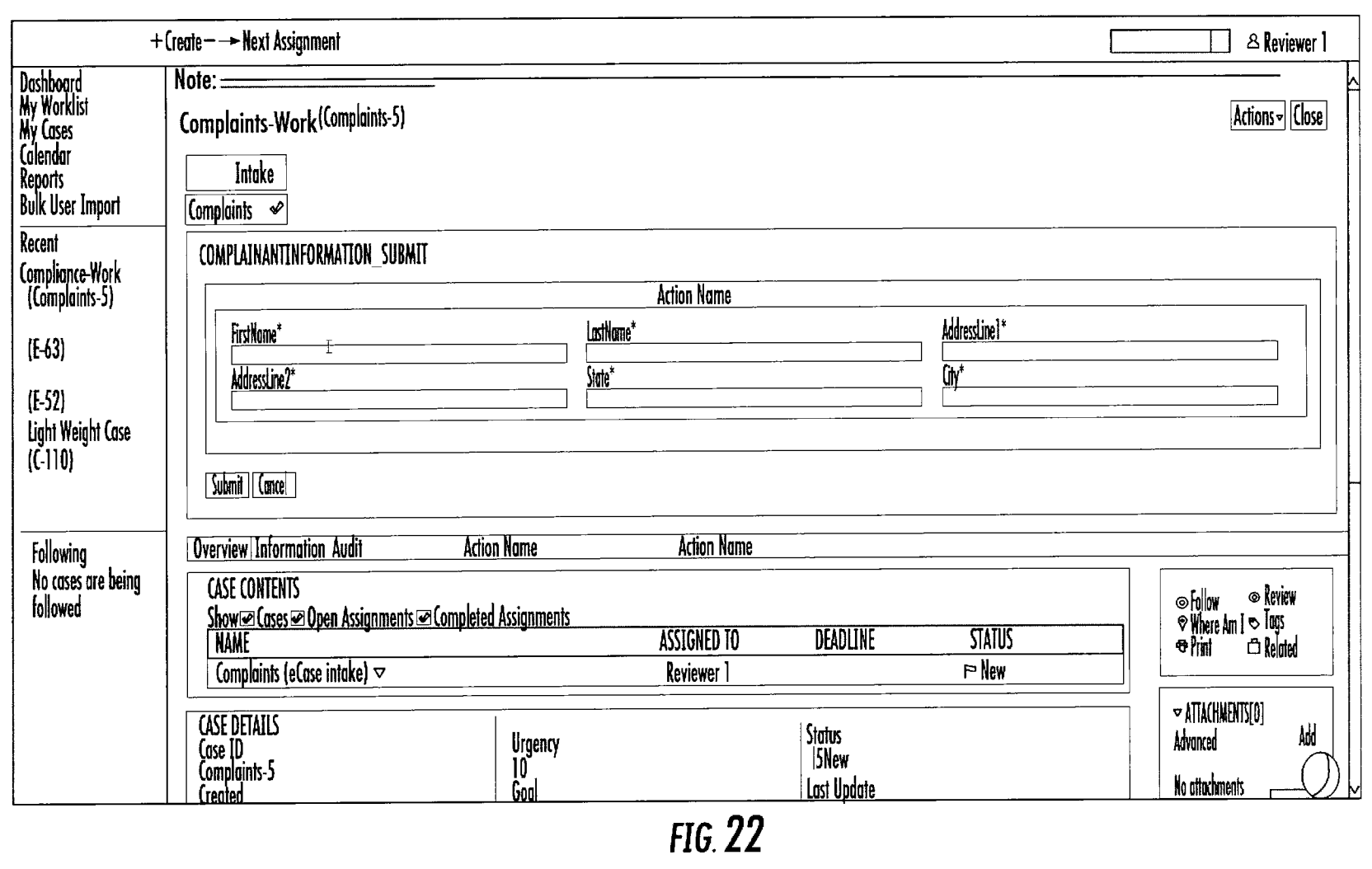
Figure 23:
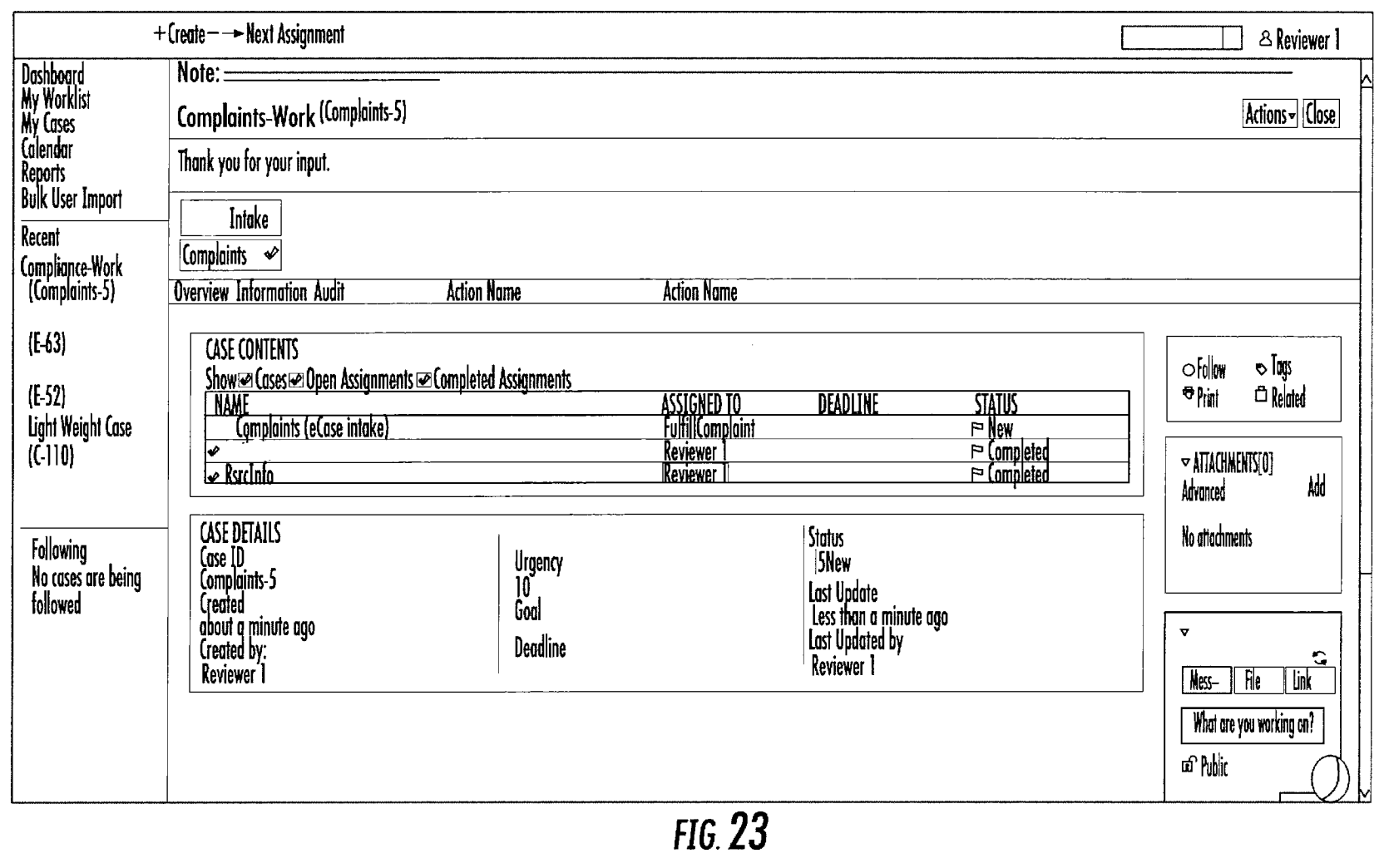
Figure 24:
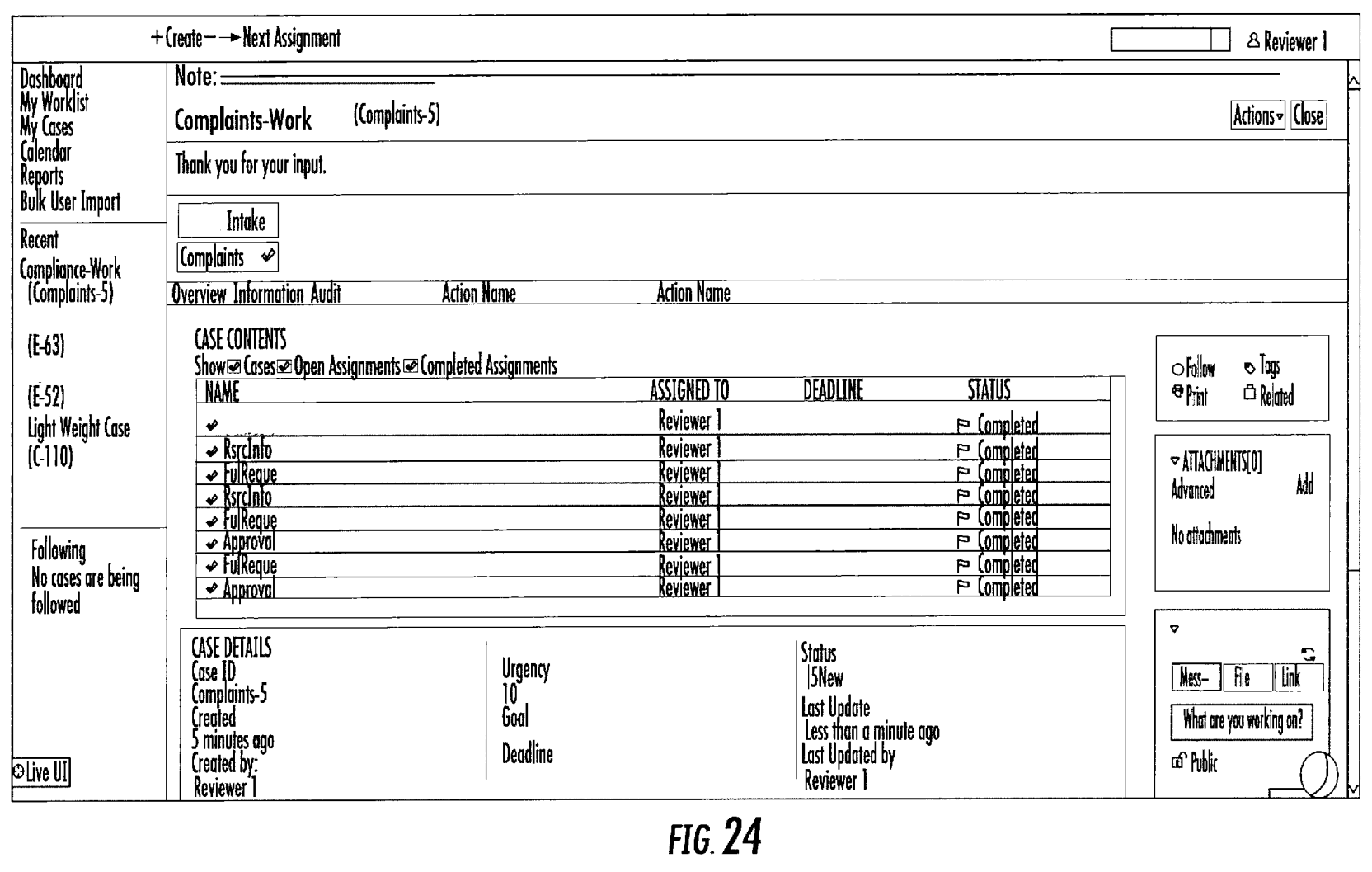

FIGS. 22-24 depict GUIs displaying a completed event case management application as an end user may see it. As depicted in FIG. 22, the end user is presented with a form prompting them to submit information including FirstName, LastName, AddressLine1, AddressLine2, State, and City. This information will be used to resolve the event.

Thus, as described above, embodiments of the present invention provide for a tool for generating event case management applications. The tool requires input of event case criteria, such as, but not limited to, event case type, steps, actions associated with the steps, actors required to perform the actions, data entry documents/forms and/or data entry fields in the documents/forms, and data entry points. Based on the received inputs and rules associated with the event case type and other event case criteria, the tool automatically generates computer code that creates an event case management application. As such, the tool provides a standardized and streamlined approach to generating event case management applications that requires minimal technology support, is cost efficient and effectively delivers deployable event case management applications in minimal time.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for generating event case management applications, the system comprising:
   a computing platform including a memory and at least one processor in communication with the memory; and
   an event case management application generator tool stored in the memory, executable by the at least one processor and configured to:
   receive inputs that define criteria for managing an event case, wherein an event case is defined as a process for resolving an event that requires a resolution, and wherein the inputs include (i) case type, (ii) a plurality of steps required to resolve the event, (iii) actions required to be performed for completion of the plurality of steps, and (iv) creating paths for selected ones of the plurality of steps, selecting one or more of the actions for inclusion in the paths and interconnecting the paths to create a process model defining an ordered sequence for the steps and actions required to resolve the event;
   in response to receiving the inputs, access a remote rules database storing rules for generating an event case management application to obtain (1) one or more first rules, the one or more first rules comprise at least rules that are specific to at least one of the case type, rules that are specific to at least one of the plurality steps, and rules that are specific to at least one of the actions required to perform the steps; and (2) one or more second rules specific to actors for performing the at least one of the plurality of steps; and
   apply the criteria, the one or more first rules, and the one or more second rules to automatically generate computer code that creates an application for managing the event case including a plurality of user interfaces for managing a workflow for resolving the event and the process model.

2. The apparatus of claim 1, wherein the event case management application generator tool is further configured to receive the inputs that define the criteria for managing the event case, wherein the inputs include for each of the plurality of steps at least one of (i) a step identifier, and (ii) an actor for performing the step.

3. The apparatus of claim 1, wherein the event case management application generator tool is further configured to receive the inputs that define the criteria for managing the event case, wherein the inputs include for each of the plurality of steps (iii) an estimated time for completing the step.

4. The apparatus of claim 1, wherein the event case management application generator tool is further configured to receive the inputs that define the criteria for managing the event case, wherein the inputs define one or more predetermined data entry documents and one or more data elements within each of the predetermined data entry documents.

5. The apparatus of claim 1, wherein the event case management application generator tool is further configured to receive the inputs that define the criteria for managing the event case, wherein the inputs define at least one of (i) steps, or (ii) actions that define a corresponding step that are associated with at least one of the one or more data entry documents or at least one of the data elements within the at least one of the data entry documents.

6. The apparatus of claim 5, wherein the event case management application generator tool is further configured to:
   in response to receiving the inputs, access the rules database to obtain one or more of the rules specific to at least one of (i) the one or more data entry documents, and (ii) the one or more data elements within the data entry documents.

7. The apparatus of claim 6, wherein the event case management application generator tool is further configured to:
   apply the user inputs and the one or more of the rules specific to the at least one of (i) the one or more data entry documents, and (ii) the one or more data elements within the data entry documents to automatically generate computer code that creates the application for managing the event case.

8. A computer-implemented method for generating event case management applications, the computer-implemented method is executed by one or more computing device processors and comprises:
   receiving inputs that define criteria for managing an event case, wherein an event case is defined as a process for resolving an event that requires a resolution, and wherein the inputs include (i) case type, (ii) a plurality of steps required to resolve the event, (iii) actions required to be performed for completion of the plurality of steps, and (iv) creating paths for selected ones of the plurality of steps, selecting one or more of the actions for inclusion in the paths and interconnecting the paths to create a process model defining an ordered sequence for the steps and actions required to resolve the event;

in response to receiving the inputs, access a remote rules database storing rules for generating an event case management application to obtain (1) one or more first rules, the one or more first rules comprise at least rules that are specific to at least one of the case type, rules that are specific to at least one of the plurality steps, and rules that are specific to at least one of the actions required to perform the steps; and (2) one or more second rules specific to actors for performing the at least one of the plurality of steps; and applying the criteria, the one or more first rules, and the one or more second rules to automatically generate computer code that creates an application for managing the event case including a plurality of user interfaces for managing a workflow for resolving the event and the process model.

9. The computer-implemented method of claim 8, wherein receiving the inputs that define the criteria for managing the event case further define the inputs as including for each of the plurality of steps at least one of (i) a step identifier, and (ii) an actor for performing the step.

10. The computer-implemented method of claim 8, wherein receiving the inputs that define the criteria for managing the event case further define the inputs as including for each of the plurality of steps (iii) an estimated time for completing the step.

11. The computer-implemented method of claim 8, wherein receiving the inputs that define the criteria for managing the event case, further define the inputs as including one or more predetermined data entry documents and one or more data elements within each of the predetermined data entry documents.

12. The computer-implemented method of claim 8, wherein receiving the inputs that define the criteria for managing the event case further define the inputs as including one of (i) steps, or (ii) actions that define a corresponding step that are associated with at least one of the one or more data entry documents or at least one of the data elements within the at least one of the data entry documents.

13. The computer-implemented method of claim 8, wherein the method further comprises:

in response to receiving the inputs, accessing the rules database to obtain one or more of the rules specific to at least one of (i) the one or more data entry documents, and (ii) the one or more data elements within the data entry documents; and applying the user inputs and the one or more of the rules specific to the at least one of (i) the one or more data entry documents, and (ii) the one or more data elements within the data entry documents to automatically generate computer code that creates the application for managing the event case.

14. A computer program product comprising at least one non-transitory computer-readable medium comprises computer-readable instructions for:

receiving inputs that define criteria for managing an event case, wherein an even case is defined as a process for resolving an event that requires a resolution, and wherein the inputs include (i) case type, (ii) a plurality of steps required to resolve the event, (iii) actions required to be performed for completion of the plurality of steps, and (iv) creating paths for selected ones of the plurality of steps, selecting one or more of the actions for inclusion in the paths and interconnecting the paths to create a process model defining an ordered sequence for the steps and actions required to resolve the event;

in response to receiving the inputs, access a remote rules database storing rules for generating an event case management application to obtain (1) one or more first rules, the one or more first rules comprise at least rules that are specific to at least one of the case type, rules that are specific to at least one of the plurality steps, and rules that are specific to at least one of the actions required to perform the steps; and (2) one or more second rules specific to actors for performing the at least one of the plurality of steps; and applying the criteria, the one or more first rules, and the one or more second rules to automatically generate computer code that creates an application for managing the event case including a plurality of user interfaces for managing a workflow for resolving the event and the process model.

15. The computer program product of claim 14, wherein the computer-readable instructions for receiving the inputs further comprise computer-readable instructions for receiving the inputs that define the criteria for managing the event case, wherein the inputs include for each of the plurality of steps at least one of (i) a step identifier, and (ii) an actor for performing the step.

16. The computer program product of claim 14, wherein the computer-readable instructions for receiving the inputs further comprise computer-readable instructions for receiving the inputs that define the criteria for managing the event case, wherein the inputs include for each of the plurality of steps (iii) an estimated time for completing the step.

17. The computer program product of claim 14, wherein the computer-readable instructions for receiving the inputs further comprise computer-readable instructions for receiving the inputs that define the criteria for managing the event case, wherein the inputs include one or more predetermined data entry documents and one or more data elements within each of the predetermined data entry documents.

18. The computer program product of claim 14, wherein the computer-readable instructions for receiving the inputs further comprise computer-readable instructions for receiving the inputs that define the criteria for managing the event case, wherein the inputs include one of (i) steps, or (ii) actions that define a corresponding step that are associated with at least one of the one or more data entry documents or at least one of the data elements within the at least one of the data entry documents.

19. The computer program product of claim 14, wherein the computer-readable instructions further comprise instructions for, in response to receiving the inputs, accessing the rules database to obtain one or more of the rules specific to at least one of (i) the one or more data entry documents, and (ii) the one or more data elements within the data entry documents.

20. The computer readable program product of claim 19, wherein the computer-readable instructions further comprise instructions for applying the user inputs and the one or more of the rules specific to the at least one of (i) the one or more data entry documents, and (ii) the one or more data elements within the data entry documents to automatically generate computer code that creates the application for managing the event case.

* * * * *